United States Patent

[11] 3,588,483

[72] Inventor Robert J. Lesniewski
Greenbelt, Md.

[21] Appl. No. 713,188
[22] Filed Mar. 14, 1968
[45] Patented June 28, 1971
[73] Assignee The United States of America as represented by the Administrator of the National Aeronautics and Space Administration

[54] VARIABLE DIGITAL PROCESSOR INCLUDING A REGISTER FOR SHIFTING AND ROTATING BITS IN EITHER DIRECTION

77 Claims, 6 Drawing Figs.

[52] U.S. Cl. .......... 235/175, 235/164
[51] Int. Cl. .......... G06f 7/50
[50] Field of Search .......... 235/175, 174, 173, 164; 307/221, 216, 218; 328/37, 159; 340/173

[56] References Cited

UNITED STATES PATENTS

| | | | |
|---|---|---|---|
| 3,239,764 | 3/1966 | Verma et al. | 235/156X |
| 3,375,358 | 3/1968 | Franck | 235/175 |
| 3,454,310 | 7/1969 | Wilhelm, Jr. | 235/152X |
| 3,374,468 | 3/1968 | Muir | 235/164X |
| 3,320,410 | 5/1967 | Barrett et al. | 235/175 |
| 3,348,069 | 10/1967 | Petschaver | 307/221 |
| 3,462,589 | 8/1969 | Robertson | 235/175X |
| 3,480,259 | 9/1968 | Maczko et al. | 235/175X |

*Primary Examiner*—Malcolm A. Morrison
*Assistant Examiner*—David H. Malzahn
*Attorneys*—R. F. Kempf, E. Levy and G. T. McCoy

ABSTRACT: Disclosed is a data processor including a plurality of cascaded registers connected together to selectively perform left and right shifts, as well as right rotation. The register stages are selectively connected to feed and be responsive to a single data line at either end thereof. The register stages are selectively connected with parallel data lines to be responsive to signals on the data lines. Words stored in the register can be combined with words on the parallel data lines in accordance with logical functions such as AND, OR, EXCLUSIVE OR, ADDITION, and SUBTRACTION. The register stages can also combine signals from one of the serial data lines with signals stored therein and from the parallel data lines.

INVENTOR,
ROBERT J. LESNIEWSKI

BY

ATTORNEYS.

INVENTOR.
ROBERT J. LESNIEWSKI

BY

ATTORNEYS

INVENTOR,
ROBERT J. LESNIEWSKI

BY

ATTORNEYS

VARIABLE DIGITAL PROCESSOR INCLUDING A REGISTER FOR SHIFTING AND ROTATING BITS IN EITHER DIRECTION

The invention described herein was made by an employee of the United States Government and may be manufactured and used by or for the Government for governmental purposes without the payment of any royalties thereon or therefor.

The present invention relates to data processors, and more particularly to a data processor including a plurality of register stages which are selectively interconnected with each other to effect a multiplicity of operations.

With the advent of large scale integrated circuits, it has become feasible to perform multiple operations which heretofore have been considered impractical because of power and space requirements. With discrete and individual integrated circuits, it has generally been the practice to interconnect computer elements in a relatively rigid manner wherein the number of possible functions that could be achieved was limited.

In accordance with the present invention, a plurality of register stages are interconnected with each other and serial data sources connected to the least and most significant stages to effect transfer of data in either direction and rotation thereof at will. Data are transferred to and from the register to lines connected to the least and most significant bit stages to reduce the number of external leads to the system.

According to another embodiment of the invention, words expressed as parallel bits are combined with words stored in the register stages in accordance with a plurality of different operating instructions, viz., logical AND, logical OR, EXCLUSIVE OR, add, subtract the register word from the word on the lines, subtract the word on the lines from the register word, and load the external word into the register. In addition, the register stages can be cleared to zero or set to one at will, and the lowest order stage is selectively responsive to serial data bits, as well as the parallel data bits. The most significant bit stage is selectively coupled to a serial data line or to an overflow indicator.

Preferably, the entire data processor comprises a large scale integrated circuit that may be mounted on a single chip to conserve space and power.

A further feature of the invention is that the parallel data lines can at will either feed bits into the register or be responsive to words stored in the register. Also, the logic between stages is established so that negative number operations are performed in the two's complement binary arithmetic.

It is, accordingly, an object of the present invention to provide a new and improved data processor having capability for multiple connections between a plurality of register stages.

An additional object of the present invention is to provide a data processor capable of performing multiple operations on parallel words; such operations being, for example, addition, subtraction, logical AND, logical OR, logical EXCLUSIVE OR, and one's and two's complementing.

A further object of the present invention is to provide a data processor including a plurality of register stages, the operation of which can be altered at will to enable left and right shifts, as well as feedback.

A further object of the present invention is to provide a data processor wherein serial and parallel data words can be fed into and derived from the computer on the same leads.

The above and still further objects, features and advantages of the present invention will become apparent upon consideration of the following detailed description of one specific embodiment thereof, especially when taken in conjunction with the accompanying drawings, wherein.

Figure 1:
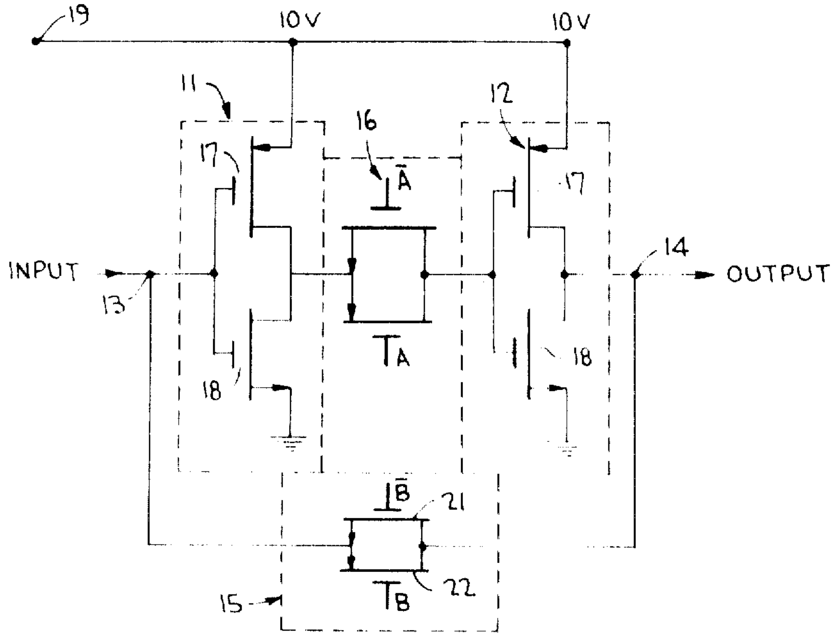
FIG. 1 is a circuit diagram of a preferred network for a single register stage.

Prior to considering the apparatus of the present invention, consideration will be given to the circuitry comprising a basic shift register stage, by referring to FIG. 1 of the drawings. The basic shift register stage of FIG. 1 comprises, in essence, a pair of inverters, each having inherent memory provision, and separated by a pair of normally closed switches. The basic shift register stage is described in conjunction with metal oxide semiconductor field effect transistors (MOSFET's) formed as large scale integrated circuit components on a chip; it is to be understood, however, that other suitable devices may be utilized in lieu of MOSFET's and integrated circuit chips.

The basic register stage comprises inverter sections 11 and 12, the former having an input responsive to binary signals at terminal 13 and the latter deriving a binary output at terminal 14. Input and output terminals 13 and 14 are selectively connected together by normally closed switch 15, while stages 11 and 12 are selectively connected to each other by normally closed switch 16.

Each of inverters 11 and 12 includes a pair of opposite conductivity type MOSFET's 17 and 18, having the source drain paths thereof connected in series between a positive, 10-volt source at terminal 19 and ground. The gate electrodes of MOSFET's 17 and 18 are connected together and to the input terminal of the inverter, whereby only one of MOSFET's 17 or 18 is forward biased at any time. Hence, only one of the MOSFET's 17 or 18 has the source drain path thereof activated to a relatively low impedance state, while the source drain path of the other MOSFET is virtually open circuited. Because of the relatively large MOSFET gate source capacitance, MOSFET's 17 and 18 include capacitive memories and store charge upon the removal of a voltage source from the gate electrodes.

Switches 15 and 16 comprise an additional pair of MOSFET's 21 and 22, having their source electrodes connected together and their drain electrodes similarly connected. The gate electrodes of MOSFET's 21 and 22 are responsive to complementary voltages, whereby both active elements comprising the switch are simultaneously open- and short-circuited.

In normal operation, with the transistors comprising switches 15 and 16 driven to the closed state, a regenerative path is established between terminals 13 and 14 since the output voltage of stage 11 is of an opposite sense from the voltage at terminal 13. The voltage at the output of stage 11 is coupled to the input of stage 12 via switch 16, whereby the voltage at terminal 14 is of the same polarity as the voltage at terminal 13. The voltage at terminal 14 is coupled back to terminal 13 through closed switch 15 to establish the regenerative feedback path.

To consider a specific example of the register stage operation, assume that terminal 13 has applied thereto a voltage equal to the voltage at terminal 19 whereby a low impedance source drain path subsists in transistor 18, while the source drain path of MOSFET 17 is virtually an open circuit. In consequence, a ground voltage is coupled to the drain electrode of MOSFET 18 and fed through closed switch 16 to the gate electrodes of stage 12. In response to the ground potential applied to the gate electrodes of stage 12, the source drain path of MOSFET 17 of stage 12 is virtually short-circuited, while the source drain path of MOSFET 18 is open-circuited. Thereby, the 10-volt source at terminal 19 is coupled through MOSFET 17 of inverter 12 to output terminal 14 to form the regenerative loop. The regenerative loop continues to provide a positive voltage at terminal 14 even though a source coupling a positive voltage to terminal 13 is decoupled from the register stage of FIG. 1. The positive voltage is derived at terminal 14 until terminal 13 is connected to a binary zero indicating ground potential, while switches 15 and 16 are open-circuited.

Because of the relatively large source gate capacity of MOSFET's 17 and 18, inverter stages 11 and 12 remain in the same state as they were previously driven even when no driving voltage is at terminal 13 and switches 15 and 16 are open-circuited. Thereby, the basic register stage illustrated has an inherent memory capacity, sufficient to enable the voltage at terminal 14 to remain relatively constant during the occurrence of switching operations which would open circuit switches 15 and 16 and decouple terminal 13 from external voltage sources.

Figure 2:
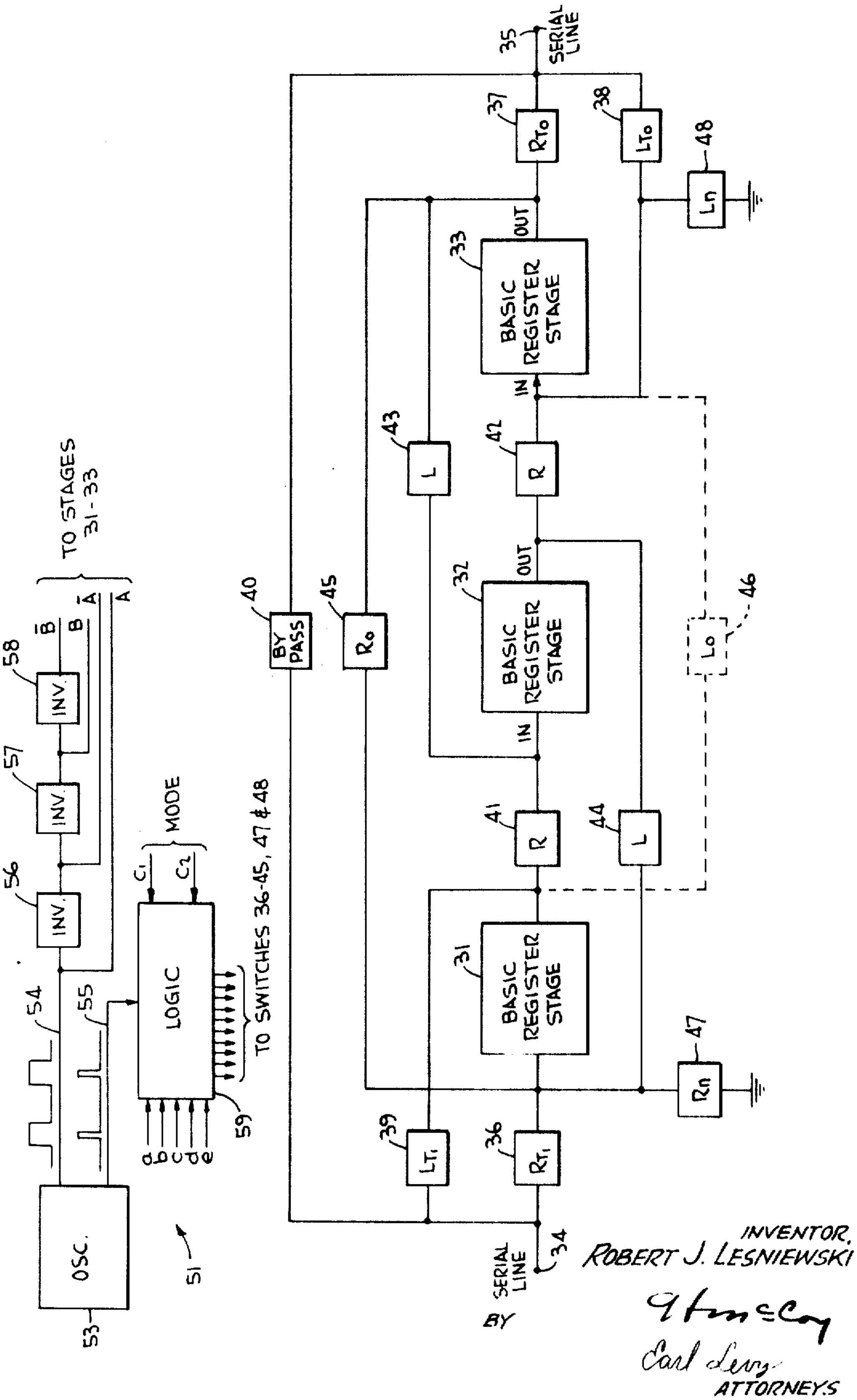
FIG. 2 is a block diagram of a serial register in accordance with one embodiment of the present invention.

The manner by which the basic shift register stage of FIG. 1 is employed in a complete large scale integrated circuit shift register capable of being activated to four different operating modes is indicated by the circuit diagram of FIG. 2, to which reference is now made. The shift register illustrated by FIG. 2, for purposes of simplicity, comprises three stages 31, 32 and 33, although in actual practice the number of stages is generally considerably in excess of three, usually being on the order of 16.

The shift register stages 31—33 can be selectively connected to feed or be responsive to binary bits on external serial data lines 34 and 35 in accordance with four different modes, viz.:

Mode 0. Shifting data in either direction from and into terminals 34 and 35;

Mode 1. Shifting data into and from terminal 34 at the left end of the register without feeding data into and/or from terminal 35;

Mode 2. Shifting data into and out of terminal 35 at the right end of the register without feeding data into and/or from terminal 34; and Mode 3. Bypassing all of stages 31—33, whereby terminals 34 and 35 are directly connected.

The several stages 31—33 comprising the entire register can be connected together whereby data are shifted left or right. In the shifting operations, binary bits at the highest and lowest order stages, 31 and 33, respectively, are selectively fed to serial data lines 34 or 35 or decoupled from the remainder of the network. In addition to the shifting instruction or operation, register stages 31—33 can be connected in a feedback loop so that data are rotated either in the right or left direction. For left rotation, shift register stages 31—33 are interconnected so that binary bits propagate from register 33 to register 32 to register 31 and back to register 33. For right rotation, the opposite direction of data flow occurs between stages 31—33.

The four modes stated supra are established by selectively closing switches between lines 34 and 35 and the input and output terminals of register stages 31—33 (the input and output terminals are always respectively shown on left and right sides of the stages). In addition, the mode connections are provided by selectively grounding the input and output of stages 31 and 33 by closing switches. In particular, mode 0 operation involving shifting or rotating in the right direction is established by closing switches 36 and 37, respectively connected between line 34 and the input of highest order stage 31 and between the output of lowest order stage 33 and line 35. Left shift and rotate connections for mode 0 operation are established by closing switches 38 and 39, respectively connected between line 35 and the input of stage 33 and between the output of stage 31 and line 34. Mode 3 operation, wherein terminals 34 and 35 are directly connected together and the stages 31—33 are isolated therefrom, is established by closing switch 40 connected between terminals 34 and 35.

Selective opening and closing of switches 36—40 establishes the four different operating modes indicated relative to external lines 34 and 35. To selectively couple data between the various shift register stages 31—33 for left and right shifts, as well as rotations regardless of the mode configuration, the register stages are interconnected with each other via normally open-circuited series switches 41—46. Switches 41 and 42 are respectively connected between the output and input terminals of stages 31 and 32 and between the output and input terminals of stages 32 and 33 to enable the propagation of binary bits in the right-hand direction for either shifting or rotation operations. In contrast, switch 43 selectively connects the output terminal of stage 33 with the input terminal of stage 32, while switch 44 is connected between the output and input terminals of stages 32 and 31, respectively. To perform right-hand rotation, the output terminal of stage 33 is connected with the input terminal of stage 31 via switch 45, while left-hand rotation is selectively established through switch 46, connected between the input and output terminals of stages 33 and 31, respectively.

For a left shift operation in modes 1 and 3, wherein data line 35 is isolated from register stages 31—33, a binary zero is fed to the input of least significant bit stage 33 by closing switch 48, connected between the input of stage 33 and ground. For right shift operations in modes 2 and 3, wherein data line 34 is decoupled from the internal register circuitry, a binary zero is fed to the input of stage 31 by closing switch 47, connected between the input of the left stage and ground.

Control of the various switches interconnecting stages 31—33 with each other and external lines 34 and 35 is in response to timing pulses derived from timing and control source 51. Timing and control source 51 includes oscillator 52 that derives on leads 53 and 54 a pair of relatively low duty cycle rectangular waves having the same frequency and identical center of occurrence times. The rectangular wave on lead 54 is designed to have a duty cycle slightly greater than the duty cycle of the wave derived on lead 55 because the voltage on the former lead controls switching within each of stages 31—33 while the signal on lead 55 controls the switches external to the register stages.

The wave on lead 54 is coupled through three cascaded inverters 56—58, each identical to the inverters included within register stages 31—33. Thereby, each of the opposite polarity voltages derived at the inputs and outputs of inverters 56—58 has a propagation delay equal to the propagation delay of each inverter stage within register stages 31—33. The inputs to inverters 56, 57 and 58 are respectively applied as the complementary input signal pairs to switches 16 and 15, whereby inverters 11 and 12 in each register stage are decoupled in response to the positive portion of the wavetrain on lead 54 in synchronism with decoupling of the inverter stages in the register stages.

The short duration pulses derived on lead 55 by oscillator 53 are coupled as timing signals to logic network 59. Logic network 59 responds to the timing pulses and a pair of command signals, $C_1$ and $C_2$, indicative of the register mode configuration. In addition, logic network 59 responds to five binary signals, *a—e*, indicative of operating connections for the register comprising stages 31—33. The operating code signals *a—e* and the mode signals $C_1$ and $C_2$ are combined with the short duration pulses on lead 55 for selective activation of switches 36—45, 47 and 48 only while a pulse is being derived on lead 55. A pulse is derived on lead 55 only while the inverters in register stages 31—33 are decoupled from each other. No output signal is derived from logic network 59 to control activation of switch 46 because, in an actual preferred embodiment of the register, there is usually no need to employ switch 46 as left rotate is, to a certain extent, a redundant function of right rotate.

Logic network 59 responds to the $C_1$ and $C_2$ inputs to control the complete register into a selected mode in accordance with:

TABLE I

| Mode | $C_2$ | $C_1$ |
|---|---|---|
| 0 | 0 | 0 |
| 1 | 0 | 1 |
| 2 | 1 | 0 |
| 3 | 1 | 1 |

From Table I, it is appreciated that each mode number corresponds with the binary equivalent for the particular number. In mode 0, generally switches connected to data lines 34 and 35, namely switches 36—39, are selectively energized; in mode 1, switches 36, 39 and 48 are selectively energized; in mode 2, switches 37, 38 and 47 are selectively energized; and in mode 3, switches 47 and 48 are selectively energized, while switch 40 is always energized.

In addition to controlling the mode connections of the switches which selectively couple data between lines 34 and 35 and the register stages between them, logic circuit 59 responds to the operation code signals *a—e* to control opening and closing of switches 41—45 independently of the mode signals $C_1$ and $C_2$.

A complete analysis of the circuit configurations established between register stages 31—33 and data lines 34 and 35 is indicated by Table II:

each other. After each of switches 15 and 16 in register stages 31—33 has been open-circuited, the second pulse on lead 55 is derived to close switches 38, 43, 44 and 39 again. The binary one signal stored in inverter 12 of register stage 33 is now coupled to inverter 11 of register 32 via switch 43. Inverter 11 changes state from the zero previously loaded therein to one in response to the signal coupled to it through switch 43 because the inverter input is isolated from any other signal source. Simultaneously, inverter 11 in stage 33 is responsive to the binary one signal on lead 35 and thereby remains in the binary one state. Upon completion of the second pulse on lead 55, each of switches 38, 43, 44 and 39 is again open-circuited

TABLE II

| | Op code | | | | | Mode | | Mode dependent switch | | | | | | | | Mode independent switch | |
|---|---|---|---|---|---|---|---|---|---|---|---|---|---|---|---|---|---|
| | a | b | c | d | e | $C_2$ | $C_1$ | $R_n$ | $R_{T1}$ | $L_{T1}$ | BY | $R_{To}$ | $L_{To}$ | $L_n$ | $R_o$ | R | L |
| L | 1 | 1 | 0 | 1 | D | 0 | 0 | 0 | 0 | 1 | 0 | 0 | 1 | 0 | 0 | 0 | 1 |
| L | 1 | 1 | 0 | 1 | D | 0 | 1 | 0 | 0 | 1 | 0 | 0 | 0 | 1 | 0 | 0 | 1 |
| L | 1 | 1 | 0 | 1 | D | 1 | 0 | 0 | 0 | 0 | 0 | 0 | 1 | 0 | 0 | 0 | 1 |
| L | 1 | 1 | 0 | 1 | D | 1 | 1 | 0 | 0 | 0 | 1 | 0 | 0 | 1 | 0 | 0 | 1 |
| R | 1 | 1 | 1 | 0 | D | 0 | 0 | 0 | 1 | 0 | 0 | 1 | 0 | 0 | 0 | 1 | 0 |
| R | 1 | 1 | 1 | 0 | D | 0 | 1 | 0 | 1 | 0 | 0 | 0 | 0 | 0 | 0 | 1 | 0 |
| R | 1 | 1 | 1 | 0 | D | 1 | 0 | 1 | 0 | 0 | 0 | 1 | 0 | 0 | 0 | 1 | 0 |
| R | 1 | 1 | 1 | 0 | D | 1 | 1 | 1 | 0 | 0 | 1 | 0 | 0 | 0 | 0 | 1 | 0 |
| $R_0$ | 1 | 1 | 1 | 1 | D | 0 | 0 | 0 | 1 | 0 | 0 | 1 | 0 | 0 | 1 | 1 | 0 |
| $R_0$ | 1 | 1 | 1 | 1 | D | 0 | 1 | 0 | 1 | 0 | 0 | 0 | 0 | 0 | 1 | 1 | 0 |
| $R_0$ | 1 | 1 | 1 | 1 | D | 1 | 0 | 0 | 0 | 0 | 0 | 1 | 0 | 0 | 1 | 1 | 0 |
| $R_0$ | 1 | 1 | 1 | 1 | D | 1 | 1 | 0 | 0 | 0 | 1 | 0 | 0 | 0 | 1 | 1 | 0 |

In Table II, the instructions, indicated by the columns denominated as I, L, R and $R_o$, are indicative respectively of instructions left shift, right shift and right rotate. Mode dependent switches 47, 36, 39, 40, 37, 38, 48 and 45, controlled by signals $C_1$ and $C_2$, are respectively indicated by $R_n$, $R_{T1}$, $L_{T1}$, BY, $R_{To}$, $L_n$, and $R_0$, while the mode independent right and left shift switches 41, 42 and 43, 44 are denominated R and L. In Table II, the presence of a binary one indicates a particular switch is closed for the duration of a pulse on lead 55, a zero indicates an open circuit condition of the switch, while a D can be zero or one, at the will of the designer.

To provide a more complete understanding as to the manner by which the register of FIG. 2 functions selectively to perform different instructions in the different connection modes, an example will be considered wherein a binary one signal, having a positive voltage, is continuously applied to terminal 34 while the $C_1$ and $C_2$ signals are both equal to zero and stages 31—33 are all cleared to zero; i.e., register connections are in accordance with mode 0 and the operation code signals, *abcde*, are respectively 11010. As indicated by the first line of Table II, logic network 59 responds to the stated mode and operation signals to shift data in the left direction from line 35 to line 34, whereby switches 38, 43, 44 and 39 are closed in response to each pulse on lead 55. While and for a short time before and after each of switches 38, 43, 44 and 39 is closed, switches 15 and 16 in each of register stages 31—33 are open-circuited in response to signals derived on lead 54.

In response to the first pulse on lead 55, switch 38 is closed to gate the positive voltage at line 35 to the input of register stage 33. Simultaneously, switches 15 and 16 in register stage 33 are in an open circuit condition, whereby inverter stage 11 in register stage 33 is loaded with a binary one. The binary one signal on terminal 35 is decoupled from the input of inverter stage 11 as the first pulse on lead 55 terminates; however, inverter 11 remains loaded to the binary one state because of the gate source capacity of MOSFET's 17 and 18. In response to the termination of the positive voltage on lead 54, switches 15 and 16 are closed and the binary one state of inverter 11 is coupled to inverter 12 within register stage 33. The binary one state of inverters 11 and 12 is maintained after the trailing edge of the first pulse on lead 54 because of the regenerative circuit established between terminals 13 and 14 through switches 15 and 16.

In response to the second pulse on lead 54, switches 15 and 16 in each of stages 31—33 are again open-circuited and inverter stages 11 and 12 in each register stage are isolated from to isolate the inverter stages 11 and 12 in each register stage from any external source. Shortly after inverters 11 of register stages 31—33 are decoupled from the output of the preceding register stage, both inverters 11 and 12 within each stage are connected in a regenerative feedback loop in response to termination of the second pulse on lead 54. From the preceding description, it is believed obvious as to the manner in which stages 31—33 function in response to the signals applied to switches 38, 39, 43 and 44.

The complete repertoire of right rotate, right shift and left shift instructions for the four different modes will now be considered.

In the right rotate operation, data bits are transferred in sequence from stage 31 to stage 32 etc., from the highest order stage to the lowest order stage. When a bit reaches lowest order stage 33, it is transferred back to the highest order stage through switch 45. In response to the register being activated into modes 0 or 2, bits are serially coupled from stage 33 through switch 37 to lead 35; in contrast, bits may be coupled from the register to line 34 from stage 31 via switch 39 only while the register is activated into modes 0 or 1.

For shifting right, data bits are transferred in sequence from the highest order stage to the lowest order stage, i.e., from stage 31 to stage 32 to stage 33 etc., from left to right. In mode 0 data bits are serially fed to the register from line 34 through switch 36 and coupled to line 35 via switch 37. If no signal source is connected to line 34, the signal stored in the highest order register stage 31 is not altered because the capacity of inverter stages 11 and 12 is sufficient to enable the stored signal to be maintained between closures of the switches within the stage.

For right shift in mode 1, any signal source connected to line 34 is fed to register stage 31 through switch 36. If line 34 is floating, most significant bit stage 31 remains activated to the same state it had in response to a prior signal being coupled thereto. For both conditions of line 34, switch 37 is open-circuited, whereby line 35 is isolated from the remainder of the register. For right shift mode 2, all connections of the register to terminal 34 are open-circuited, while any data bits derived from least significant register stage 33 are coupled through switch 37 to terminal 35. Switch 47 is closed in response to each pulse on lead 55, whereby most significant bit stage 31 is continuously loaded with binary zeros. For right shift, mode 3, any signals coupled to terminal 34 are fed to terminal 35 via bypass switch 40, while the remainder of the register is decoupled from lines 34 and 35. Simultaneously, binary zeros are continuously fed to the input of stage 31 through switch 47 and internal shifts within the register occur without readout to line 35.

In all four modes, left shift generally involves shifting the contents of a lower order register stage to a higher order stage, i.e., shifting from the output of a stage to the right, as illustrated by FIG. 2, to the left. For example, the contents at the output of stage 33 are shifted to the input of stage 32 and the output of stage 32 is shifted to the input of stage 31.

In left shift, mode 0, data bits coupled to line 35 are fed through switch 38 to the input of register stage 33 and are ultimately coupled from register stage 31 through switch 39 to data line 34. If terminal 35 is decoupled from a signal source and is floating, register stage 33 remains in the state to which is was previously activated in response to the last signal fed thereto. For left shift, mode 1, the output of register stage 31 is coupled to line 34 through switch 39, while line 35 is decoupled from stage 33 due to both switches 37 and 38 being open-circuited. Binary zeros are continuously loaded into least significant bit register stage 33 in response to switch 48 being closed upon the occurrence of each pulse on lead 55. For left shift, mode 2, signal sources connected to line 35 are coupled to the input of register stage 33 via switch 38 while the output of stage 31 is decoupled from lead 34. If no signal source is connected to line 35, but the line is floating, least significant bit register stage 33 remains in the same state as the one to which it was previously activated. In left shift, mode 3, data lines 34 and 35 are connected together and are decoupled from all of the register circuitry.

Internally of the register, the contents of stages 31—33 are sequentially fed from the lowest order register stage to the highest order stage. As signals are read from the lowest order stage 33, binary zeros are fed thereto in response to switch 48 being closed in synchronism with each pulse on lead 55.

The registers of FIG. 2 can be interconnected with other registers having the same configuration to form larger registers having stages which can be selectively interconnected. The registers can be connected in series with each other, in parallel with each other, or in series parallel combinations to provide variable series operations. For example, it it were desired to provide a variable register having 48 stages, three 16-stage registers could be interconnected in series. Once the 48-stage register was established, it is possible, for example, to segregate the 16-stage registers into separate parts which may include 32 stages and 16 stages. Data can be independently written into and out of the 16- and 32-stage registers, or different 16-stage registers can be bypassed at will. In general, it can be stated that if N registers of the type illustrated by FIG. 2 are interconnected, $4^N$ different circuit combinations of those registers are possible.

Figure 3:
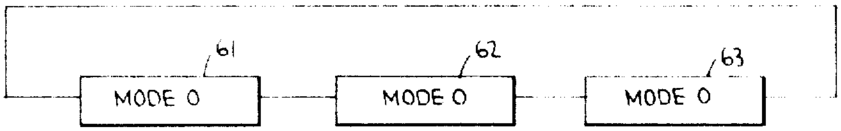
FIGS. 3, 4 and 5 are block diagrams illustrating the manner by which several registers of the type illustrated by FIG. 2 may be interconnected.
Figure 4:
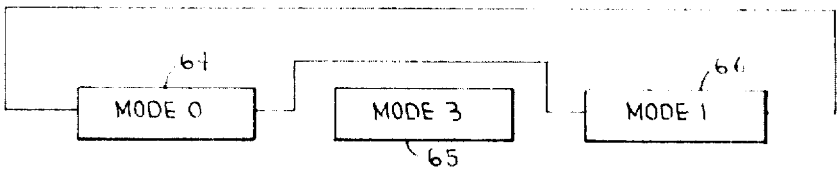
Figure 5:
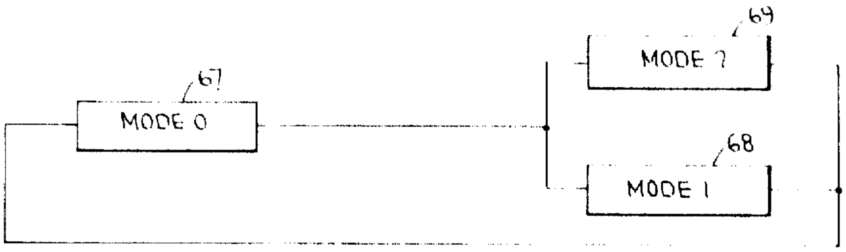

Exemplary of some of the different combinations possible utilizing three registers of the type illustrated by FIG. 2 are circuits shown by FIGS. 3—5. In FIG. 3, each of registers 61, 62 and 63 is energized to mode 0 and the left and right data lines of each register are connected to the data lines of the adjacent register. Data are free to circulate between the various registers 61—63 to form a complete feedback register having a total of 48 stages. Data can be shifted in the right or left direction between registers 61—63 and the individual registers can be activated, one at a time, to a rotate mode.

In FIG. 4, the same three registers of FIG. 3 are interconnected, whereby registers 64 and 66 are connected with each other and respectively activated to modes 0 and 1; register 65 being activated into mode 3 is isolated from registers 64 and 66. Thereby, register 65 is unresponsive to circulation of data between registers 64 and 66 but can be energized for internal rotation and shifts as indicated by Table II supra. Registers 64 and 66 are interconnected with each other so that, for example, in response to a right rotate operation code, the output of the least significant stage of register 64 is fed to the most significant stage of register 66. Simultaneously, the most significant stage of register 64 remains in the state to which it was previously activated by a signal source coupled thereto; the most significant bit stage of register 64 is unresponsive to signals from the least significant stage of register 66 because the latter register is in mode 1 operation.

If the register configuration of FIG. 4 receives the operation code indicative of a left shift, the most significant bit stage of register 66 is coupled to the least significant bit stage of register 63. Simultaneously, the contents of the most significant bit stage of register 63 are overflow, and can be indicated as such as seen infra. The most significant bit stage of register 63 is not coupled to the least significant bit stage of register 66 because the latter register is in mode 1, whereby the least significant bit stage thereof is repeatedly loaded with binary zero signals.

A further possible circuit configuration for a plurality of registers is illustrated by FIG. 5 wherein register 67 is energized to mode 0 and is connected in series with the parallel combination of registers 68 and 69, respectively energized to modes 1 and 2. By virtue of the mode configurations, the right side data terminal of register 67 is connected to the left side data terminal of registers 68 and 69, while the right side data terminals of the latter registers are connected to the left side data terminal of register 67.

With registers 67—69 in the stated mode conditions and assuming a rotate right operation command, the least significant bit stage of register 67 feeds binary bits to the most significant bit stages of registers 67 and 68. The most significant bit stage of register 68 responds to the signals fed to it from registers 67 and 69 as an OR circuit. The signal in the most significant stage of register 68 is circulated or rotated to the right, but output signals are not derived from the right output terminal of register 68. Register 69, however, is unresponsive to the contents of the least significant stage of register 67, by virtue of the former register being in mode 2; but register 69 continuously feeds the contents of its least significant bit stage to the most significant bit stage of register 67. In addition, the bits continuously derived from the least significant bit stage of register 69 are continuously fed back to the most significant stage thereof in response to the right rotation operation.

From the foregoing examples, it is believed obvious as to how a plurality of registers of the type illustrated by FIG. 2 can be interconnected together to provide various programmable functions as may be desired. The functions are not limited on an a priori basis but are completely amorphous and may be established at will in response to operation codes and mode connections.

Figure 6:
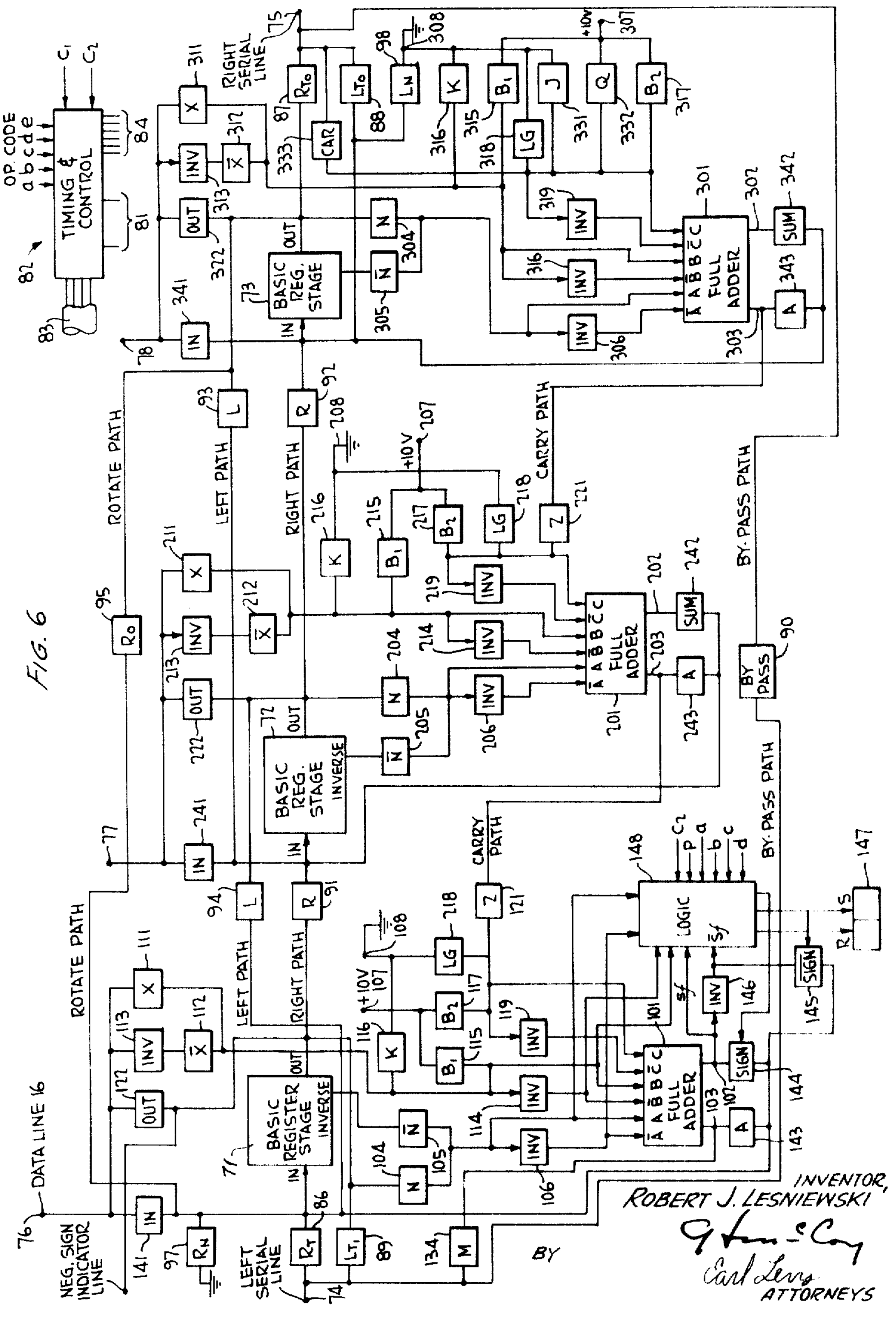
FIG. 6 is a block diagram illustrating an embodiment of a parallel processor according to the present invention.

Consideration will now be given to the circuitry by which the basic register configuration of FIG. 2 can be employed as a large scale integrated circuit variable parallel processor, i.e., as a computer responsive to signals derived on parallel leads and fed to parallel arithmetic computing circuitry. The parallel processor illustrated by FIG. 6 comprises three register stages 71—73 interconnected with each other selectively in a similar manner to register stages 31—33 of FIG. 2. Each of register stages 71—73 is substantially the same as the register stage illustrated by FIG. 1. A difference, however, exists between register stages 71—73 and the stage of FIG. 1 since the variable parallel processor of FIG. 6 is required to derive indications of the inverted state of a register. To this end, an output is derived from the gate electrode connection of inverter 12 for each of the register stages 71—73.

While the variable parallel processor of FIG. 3 is illustrated as including only three stages, it is to be understood that in an actual practical system, the number of stages is considerably in excess of three and is generally on the order of 16. By illustrating the variable parallel processor as having three stages, redundant circuitry associated with the central stages is eliminated from the drawing to simplify the exposition herein.

There are however many redundant switching components associated with each of stages 71—73. To simplify the description of these redundant components, all switches associated with register stages 71, 72 and 73, are respectively assigned reference numerals in the 100's, the 200's and the 300's. All switches that are identically connected in each of the register stage circuitry have identical unit and tens reference numerals. In general, only the circuitry for switches associated with the central stage register 72 are described in detail. Any differences in the circuitry associated with register stages 71 and 73 relative to register stage 72 are described in detail.

Register stages 71—73 are selectively coupled to read binary bits in sequence to and from left and right serial data lines 74 and 75; in addition, each of the register stages is selectively responsive to and from a binary bit on each of parallel data lines 76—78.

Stages 71—73 are selectively interconnected by means of switches 86—95, 97 and 98 in the same manner as register stages 31—33 are interconnected with switches 36—45, 47 and 48 to perform the same operations as the circuit of FIG. 2, as indicated by Table II, supra. For purposes of convenience, the similarly connected switches of FIGS. 2 and 6 have identical unit reference numerals and tens reference numerals displaced by a factor of 5.

Control of switches 86—95, 97 and 98 is in response to timing signals derived on leads 81 at the output of timing and control network 82, which is generally similar to timing and control network 51, FIG. 2. Timing and control network 82 derives output signals for controlling switching within register stages 71—73 in the same manner as stages 31—33 are controlled in response to the signals fed into and derived from inverters 56—58.

In addition to the time controlled signals derived on leads 81 and 83, timing and control network 82 responds to the operation code bits *a—e* and mode control signals $C_1$ and $C_2$ to selectively activate other switches associated with each of register stages 71—73 independently of timing pulses. The time independent switches associated with stages 71—73 respond to the operation code bits *a—d* and the mode control signals $C_1$ and $C_2$ to enable 16 different instructions or commands to be performed by the parallel processor. The instructions are fed to the computer switches via leads 84 in response to the operation code bits *a—d* to enable the contents of the stages 71—73 to be: (1) selectively combined with signals on parallel input leads 76—78; (2) selectively combined with signals on serial leads 74 and 75; (3) cleared to zero or set to one; (4) shifted left and right; (5) loaded in response to the parallel data bits on leads 76—78; or (6) rendered into a nonoperating condition. Exemplary of how signals stored in stages 71—73 may be combined with the parallel data bits on leads 71—78 are the logic operations of AND, OR and EXCLUSIVE OR; and binary addition and subtraction in either the one's or two's complement mode. Subtraction may be effected so that the contents of registers 71—73 are either the minuend or subtrahend. The operation code bit *e* is derived at will for any combination of operation codes *a—d*. Thereby, the contents of register stages 71—73 are read out to parallel data lines 76—78 whenever the operation code *e* occurs.

Consideration is now given to the circuitry associated with the middle register stage 72, FIG. 6. Each of the switches to be described in conjunction with register stage 72 is operated in response to a predetermined combination of signals on leads 81 and 84. The inverters in the circuitry associated with register stage 72 are not switched, however, but are always in operation.

All arithmetic operations in the middle stage are performed in full adder 201, having input terminals A, $\bar{A}$, B, $\bar{B}$, C, and $\bar{C}$. Full adder 201 responds to the three input signals thereof to derive a sum signal output on lead 202 and a carry signal output on lead 203. Full adder 201 includes conventional circuitry whereby the binary sum signal derived on lead 202 is represented as the Boolean function:

$$S=A\,B\,C+A\,\bar{B}\,\bar{C}+\bar{A}\,B\,\bar{C}+\bar{A}\,\bar{B}\,C,$$

while the carry signal derived on lead 203 is indicative of the Boolean function:

$$A\,B+C\,(A+B).$$

The input signals to terminals A and $\bar{A}$ of full adder 201 are derived from the true and inverted signals stored in register stage 72. To this end, switches 204 and 205 are respectively connected to the output and input of inverter 12 within stage 72, and the outputs of the switches are fed to a common junction at the A input terminal of full adder 201. The common junction of switches 204 and 205 is also fed to the $\bar{A}$ input of full adder 201 via inverter 206.

The input signals to the B and $\bar{B}$ terminals of full adder 201 are selectively responsive to the binary bits on lead 77 or the binary one and zero signals derived respectively from the +10 volt source at terminal 207 and the ground voltage at terminal 208. Coupling of signal from parallel input lead 77 to the B and $\bar{B}$ input terminals of full adder 201 is via switches 211 and 212, the former of which is directly responsive to the bit fed to lead 77 and the latter being responsive to the complement of the bit, as coupled through inverter 213. The output terminals of switches 211 and 212 have a common connection to the B input of full adder 201 as well as a connection to the $\bar{B}$ input of the full adder through inverter 214. The binary one and zero signals at terminals 207 and 208 are selectively fed to the B and $\bar{B}$ input terminals of full adder 201 via switches 215 and 216, respectively.

The C and $\bar{C}$ inputs of full adder 201 are selectively responsive to the binary one and zero voltages at terminals 207 and 208 via connections selectively established through a common junction at the output of switches 217 and 218, with the $\bar{C}$ input terminal of the full adder being fed by the output of inverter 219. The C and $\bar{C}$ input terminals of full adder 201 are also responsive to a carry signal derived from full adder 301 associated with register stage 73, as coupled through switch 221.

Each of the just previously described switches, i.e., switches 204, 205, 211, 212, 215—218, and 221, is actuated in response to logical combinations of the *a—d* operation code signals fed into timing and control network 82 as derived on output leads 84. Thereby, the selective activation of each of these switches is independent of any timing pulses derived in timing and control unit 82 and depends solely upon a desired operation to be performed by the variable parallel processor.

The exact relationship between operation code bits *a—e* and these switches is described by means of Table III.

TABLE III

| | Op code | | | | | Switches independent of time | | | | | | | | | | | | | | Time dependent switches | | |
|---|---|---|---|---|---|---|---|---|---|---|---|---|---|---|---|---|---|---|---|---|---|---|
| I | a | b | c | d | e | N | $\bar{N}$ | X | $\bar{X}$ | K | $B_1$ | LG | $B_2$ | Z | Out | (3, 1) Q | (3, 1) J | (0, 2) $C_{ar}$ | (0, 1) M | A | SUM | IN |
| NOP | 0 | 0 | 0 | 0 | 0 | D | 0 | 0 | 0 | 0 | 0 | 0 | 0 | 0 | 0 | 0 | 0 | 0 | 0 | 0 | 0 | 0 |
| XOR | 0 | 0 | 0 | 1 | 0 | 1 | 0 | 1 | 0 | 0 | 0 | 1 | 0 | 0 | 0 | 0 | 0 | 0 | 0 | 0 | 1 | 0 |
| CNTD | 0 | 0 | 1 | 0 | 0 | 1 | 0 | 0 | 0 | 0 | 1 | 0 | 0 | 1 | 0 | 0 | 1 | 1 | 1 | 0 | 1 | 0 |
| CNTU | 0 | 0 | 1 | 1 | 0 | 1 | 0 | 0 | 0 | 1 | 0 | 0 | 0 | 1 | 0 | 1 | 0 | 1 | 1 | 0 | 1 | 0 |
| SM | 0 | 1 | 0 | 0 | 0 | 0 | 1 | 1 | 0 | 0 | 0 | 0 | 0 | 1 | 0 | 1 | 0 | 1 | 1 | 0 | 1 | 0 |
| SMZ | 0 | 1 | 0 | 1 | 0 | 0 | 1 | 0 | 0 | 1 | 0 | 0 | 0 | 1 | 0 | 1 | 0 | 1 | 1 | 0 | 1 | 0 |
| AD | 0 | 1 | 1 | 0 | 0 | 1 | 0 | 1 | 0 | 0 | 0 | 0 | 0 | 1 | 0 | 0 | 1 | 1 | 1 | 0 | 1 | 0 |
| SUB | 0 | 1 | 1 | 1 | 0 | 1 | 0 | 0 | 1 | 0 | 0 | 0 | 0 | 1 | 0 | 1 | 0 | 1 | 1 | 0 | 1 | 0 |
| SET | 1 | 0 | 0 | 0 | 0 | D | 0 | 0 | 0 | 0 | 1 | 0 | 1 | 0 | 0 | 0 | 0 | 0 | 0 | 1 | 0 | 0 |
| OR | 1 | 0 | 0 | 1 | 0 | 1 | 0 | 1 | 0 | 0 | 0 | 0 | 1 | 0 | 0 | 0 | 0 | 0 | 0 | 1 | 0 | 0 |
| CLEAR | 1 | 0 | 1 | 0 | 0 | D | 0 | 0 | 0 | 1 | 0 | 1 | 0 | 0 | 0 | 0 | 0 | 0 | 0 | 1 | 0 | 0 |
| AND | 1 | 0 | 1 | 1 | 0 | 1 | 0 | 1 | 0 | 0 | 0 | 1 | 0 | 0 | 0 | 0 | 0 | 0 | 0 | 1 | 0 | 0 |
| IN | 1 | 1 | 0 | 0 | 0 | D | 0 | 0 | 0 | 0 | 0 | 0 | 0 | 0 | 0 | 0 | 0 | 0 | 0 | 0 | 0 | 1 |
| L | 1 | 1 | 0 | 1 | 0 | D | 0 | 0 | 0 | 0 | 0 | 0 | 0 | 0 | 0 | 0 | 0 | 0 | 0 | 0 | 0 | 0 |
| R | 1 | 1 | 1 | 0 | 0 | D | 0 | 0 | 0 | 0 | 0 | 0 | 0 | 0 | 0 | 0 | 0 | 0 | 0 | 0 | 0 | 0 |
| $R_c$ | 1 | 1 | 1 | 1 | 0 | D | 0 | 0 | 0 | 0 | 0 | 0 | 0 | 0 | 0 | 0 | 0 | 0 | 0 | 0 | 0 | 0 |
| OUT | D | D | D | D | 1 | | | | | any of above | | | | | 1 | 0 | 0 | 0 | 0 | | | |

To provide a complete understanding of Table III, the following legend is provided:

LEGEND

I = instruction;
O = switch open;
1 = switch closed;
D = switch either opened or closed;
NOP = processor not in operation;
XOR = EXCLUSIVE OR;
CNTD = countdown, i.e., for each timing pulse derived in timing and control unit 82 a one is subtracted from the contents of the register comprising stages 71—73;
CNTU = count up, i.e., a one is added to the contents of the register formed by stages 71—73 in response to each timing pulse;
SM = subtract the contents of the register comprising stages 71—73 from the word on data lines 76—78;
SMZ = complement the contents of the register comprising stages 71—73 and add the binary signal on right data line 75 to the register contents;
AD = add the contents of the register comprising stages 71—73 with the binary word on parallel data lines 76—78;
SUB = subtract the binary word on parallel data lines 76—78 from the contents of the register comprising stages 71—73;
SET = set the contents of each stage of the register comprising stages 71—73 to one;
OR = combine the binary bits on each of leads 76—78 with the signal stored in each of register stages 71—73 in accordance with the OR logic function;
CLEAR = clear each of register stages 71—73 to a zero binary level;
AND = combine the binary bits on each of leads 76—78 with the binary word stored in register stages 71—73 in accordance with the logical AND function;
LOAD = load the binary bits on leads 76—78 into register stages 71—73, respectively;
L = shift the contents of register stages 71—73 to the left;
R = shift the contents of register stages 71—73 to the right;
$R_o$ = rotate the contents of register stages 71—73 to the right and provide feedback from the output of stage 73 to the input of stage 71;
OUT = feed the contents of register stages 71—73 to parallel data lines 76—78, respectively;
N = switches 104, 204 and 304;
$\bar{N}$ = switches 105, 205 and 305;
X = switches 111, 211 and 311;
$\bar{X}$ = switches 112, 212 and 312;
K = switches 116, 216 and 316;
$B_1$ = switches 115, 215 and 315;
LG = switches 118, 218 and 318;
$B_2$ = switches 117, 217 and 317;
Z = switches 121 and 221; and
( ) = modes switch is closed; in all other modes switch is open.

Additional switches are indicated in Table III by the legends $O_{ut}$, Q, J, $C_{ar}$, M, A, SUM and IN. As the description proceeds and these switches are described, they will be referred to by both reference numerals and letters initially. The letters to which they are referred will correspond with the assignments given in Table III.

To read the contents of stages 71—73 at will to parallel lines 76—78, regardless of any other instruction fed to the parallel processor, $O_{ut}$ switch 222, closed in response to the operation code *e*, is connected between the output of stage 72 and input lead 77. Since operation code *e* controls no other switch than readout switch 222 and corresponding switches 122 and 322 in the circuitry associated with registers 71—73, it is seen that data are read out from stages 71—73 at will, independently of any other operation being performed. The system is generally operated, however, so that switch 222 is never closed while any of switches 211, 212 and readin switch (IN) 241 are closed to obviate coupling of data read from stage 72 back to the circuitry associated with that stage.

Consideration will now be given to switches in the circuitry associated with registers 71 and 73 which are responsive to both mode control signals $C_1$ and $C_2$ and operation code signals *a—d*. There are no switches in the circuitry associated with middle register stage 72 responsive to the mode control signals.

In modes 1 and 3, J and Q switches 331 and 332 selectively connect the C and $\bar{C}$ input terminals of full adder 301 to the binary zero and one levels at terminals 208 and 207, respectively. For modes 0 and 2, switches 331 and 332 are always open-circuited. In modes 0 and 2, the C and $\bar{C}$ inputs of full adder 301 are selectively responsive to the serially derived bits which may be fed to terminal 75 as coupled through CAR switch 333, always open-circuited for modes 1 and 3. Selective coupling of the carry output of full adder 101 on lead 103 to the left serial terminal 74 is accomplished by selectively closing M switch 134 with the system activated to modes 0 and 1. In response to the system being energized to modes 2 or 3, however, switch 134 remains always deactivated or open-circuited.

Each of the foregoing switches is activated independently of time in response to the signals derived from timing and control unit 82 on leads 84. To control proper operation of register stages 71—73 in concert with switching of data therein as controlled by the timing signals derived on lead 83, the circuitry associated with each of stages 71—73 includes additional switches controlled by timing signals derived on leads 81. The timing signals derived on leads 81 of timing and control unit 82 control activation of switches 86—95, 97 and 98 at a time when the inverters in stages 71—73 are decoupled from each other in a manner similar to control of the FIG. 1 circuitry in response to the signals on leads 83. Similarly, the switches about to be described are activated to the closed state only while inverters 11 and 12 in register stages 71—73 are decoupled.

The switches controlled by the time dependent pulses on lead 81 are IN switch 241, SUM switch 242 and A switch 243. Switch 241 is selectively closed between the input terminal of stage 72 and the binary bit applied to lead 77 whenever it is desired to load stage 72 with a signal. The sum and carry signals respectively derived on leads 202 and 203 are selectively fed through switches 242 and 243 to the input terminal of register 72 during the counting, arithmetic and logic operations.

It is noted that the circuitry associated with register stage 71 does not include a SUM switch; instead, it includes SIGN and $\overline{\text{SIGN}}$ switches 144 and 145 respectively responsive to the true and complementary sum signals derived from full adder 101 on lead 102; the complementary signal is fed to switch 145 through inverter 146. Switches 144 and 145 are actuated to indicate the presence of an overflow from the highest order stage 71 in certain mode configurations. In synchronism with the operation of switches 144 and 145 overflow flip-flop 147 is actuated whenever $\overline{\text{SIGN}}$ switch 145 is energized.

The sign or polarity of words in the present computer is expressed in the well-known manner wherein the most significant bit in a word, as stored in register 71 or on lead 76, has binary one and zero values respectively for negative and positive numbers. Hence, positive and negative numbers stored in the register comprising stages 71—73 result respectively in stage 71 being activated to the zero and one states; positive and negative numbers coupled to parallel input leads 76—78 are indicated by the presence respectively of binary zeros and ones on data line 76.

Activation of switches 144 and 145 is in response to the *a*—*d* bits of the operation code, the polarity of the word applied by the register comprising stages 71—73 to adder 101, $S_1$, the polarity of the word applied by data lines 76—78 to adder 101, $S_2$, the mode of register stages 71—73, as indicated by $C_2$ for modes 2 or 3, or $\overline{C}_2$ 2modes 1 or 2. These signals are logically combined in logic network 148 with the sum output signal of full adder 101 on lead 102 and a timing pulse, P, occurring in time coincidence with the timing pulse derived on leads 81. In particular, logic network 148 responds to the inputs thereof to drive switch 144 to the closed state when the following expression has a binary one value:

$$SIGN=S_f bS_1S_2+S_fS_1aS_2)C_2+C_2aa(b+c+d)+C_2(abcabd)]P \quad (1).$$

Logic network 148 also drives switch 145 to the closed state while setting overflow flip-flop 147 in accordance with:

$$SIGN=(S_f b0S_1S_2+S_fS_1aS_2)ab_2P \quad (2),$$

and resets flip-flop 147 in response to:

$$(S_fS_1S_2+S_fS_1S_2)C_2P \quad (3).$$

Control of switch 144 in accordance with Equation (1) enables the switch to gate sum signals on lead 102 to the input of stage 71 for three different situations, viz: 1. for mode 2 or 3 configuration, any of the operations involving arithmetic operations of the words on parallel data leads 76—78 and the contents of register stages 71—73 (SM, SMZ, AD and SUB); 2. for mode 0 or 1 configuration, any of the operations involving combining data on the serial and/or parallel data lines 75—78 with the contents of register stages 71—73 (XOR, CNTD, CNTU, SM, SMZ, AD and SUB); and 3. for mode 2 or 3 configuration, the counting and EXCLUSIVE OR operations (CNTD, CNTU and XOR). The first situation is indicated by the expression $(\overline{S}_fS_1S_2+S_f\overline{S}_1\overline{S}_2)C_2\overline{a}b$, while the second and third result from $\overline{C}_2a(b+c+d)$ and $C_2(\overline{ab}c+\overline{ab}d)$, respectively. It is noted that if $\overline{(\overline{S}_fS_1S_2+S_f\overline{S}_1\overline{S}_2)}$ has a binary value of one no overflow is propagated.

A distinction between the circuitry associated with stage 73 relative to the circuitry associated with stage 72 is that in the former no carry switch, such as switch 221, is provided. The carry switch is not required in the lowest order of the register because there is no carry to propagate thereto, In effect, however, mode controlled switches 331, 332 and 333 function similarly to carry switch 221 to feed binary zero and one signals to the C input terminal of adder 301.

Attention is now given to the manner by which the computer of FIG. 6 performs each of the operations indicated by Table III, except for the left shift, right shift and right rotate instructions, L, R and $R_0$, which are performed in the same manner as described supra with regard to the embodiment of FIG. 2 and Table II. Initial consideration is given to the eight instructions which are performed in the same manner regardless of operating mode signals $C_1$ and $C_2$. Thereafter, the more complicated instructions relating to operations that are controlled and changed by the mode signals are described. The description is given at all times in conjunction with Table III, supra.

For the nonoperating mode, NOP, the operating code bits *a*—*d* are all set to a value of zero. The *abcd* operating code bits 0000 are combined in timing and control logic unit 82 to open circuit each of the switches in the system, with the possible exception of switch 204. The status of switch 204 is irrelevant because any response derived from full adder 201 on lead 202 cannot be propagated through switch 242. For the EXCLUSIVE OR function, XOR, the operating code bits *a*, *b*, *c* and *d* respectively have the values of 0, 0, 0, 1, to close switches 204, 211 and 218 while each of the other time independent switches are open-circuited. Time dependent switch 242 is closed in response to a timing pulse from timing and control network 82 during the instant the inverters of stages 71—73 are decoupled from each other.

In response to switches 204, 211 and 218 being activated to the closed state, the bits derived from stage 72 and fed to lead 77 are respectively applied to the A, $\overline{A}$ and B, $\overline{B}$ input terminals of full adder 201, while the C terminal of the full adder is grounded to terminal 208. In consequence, full adder 201 derives on sum lead 202 a signal indicative of the EXCLUSIVE OR function of the signals derived from stage 72 and the input bit on lead 77. In response to a timing pulse from timing and control unit 82, switch 242 is closed to feed the EXCLUSIVE OR signal on lead 202 to the input of register stage 72 while the inverters of the register stage are decoupled from each other, whereby the first inverter stage 11 in the register stage 72 is loaded with the resultant of the logic operation.

To set register stage 72 to the binary one state, SET, operation code bits *a*, *b*, *c*, *d* respectively have values of 1, 0, 0, 0; which results in switches 215 and 217 being closed independently of timing pulses while switch 243 is closed in response to timing pulses generated by timing and control network 82. In addition, switch 204 can be set to be either open or closed, depending upon the designer of the processor. In response to switches 215 and 217 being closed, binary ones are applied to the B and C inputs of full adder 201 and the binary signal derived on lead 203 has a binary one value regardless of the value of the signal coupled to the A and $\overline{A}$ terminals of the full adder. The binary one signal on lead 203 is coupled through switch 243 to the input of register stage 72 in response to the derivation of a timing signal in timing and control unit 82.

To combine the signal on terminal 77 with the state of register stage 72 in accordance with the logical OR function, OR, operating code bits *a*, *b*, *c*, *d* respectively have values of 1, 0, 0, 1. In response to the operating code indicative of the OR instruction, switches 204, 211 and 217 are actuated, while switch 243 is closed in response to a timing pulse from timing and control unit 82. In response to switch 217 being closed, a binary one signal is fed to the C input terminal of full adder 201, whereby the signal derived by the full adder on carry lead 203 is indicative of the OR logic function of the bits on lead 77 and stored in register stage 72. The OR function signal derived on lead 203 is coupled through switch 243 to the input of stage 72 in response to a timing pulse from timing and control unit 82 while the inverters of register stage 72 are decoupled from each other.

Clearing register stage 72 to a zero state, CLEAR, is performed in response to the operation code *abcd*=1010. The 1010 operation code actuates switches 216 and 218 to the closed state and enables switch 243 to be closed in response to a timing pulse. The clear instruction can be utilized to open or close switch 204 at the desire of the process designer. In response to switches 216 and 218 being closed, binary zero signals are fed to the B and C input terminals of full adder 201, whereby the signal derived on carry lead 203 is a binary zero regardless of the signal level fed to terminal A. Thereby, in response to switch 243 being closed by a timing pulse, a binary zero is coupled to the input of register stage 72.

The logical AND function, AND, combining the bit on lead 77 with the contents of stage 72, is performed in response to the operating code bits *a*, *b*, *c*, *d* having values respectively of 1, 0, 1, 1. The *abcd*=1011 operating code closes switches 204, 211 and 218 and enables switch 243 to be closed in response to a timing pulse from timing and control unit 82. In response to switches 204 and 211 being closed, the signals derived from register 72 and on lead 77 are respectively applied to the A and B inputs of full adder 201. Closure of switch 218 results in the application of a binary zero signal to the C input terminal of full adder 201, whereby the signal derived on carry output lead 203 of the full adder is indicative of the AND logic function combining the contents of register stage 72 with the binary bit applied to lead 77. The AND function output on lead 203 is gated to the input of register 72 through switch 243 in response to a timing pulse being derived in timing and control unit 82.

Loadii.g the binary bit at terminal 77 into register stage 72, IN, occurs in response to the operating code bits *a*, *b*, *c*, *d* having values of 1, 1, 0, 0, respectively. In response to the load operating code and a timing pulse from timing and control unit 82, switch 241 is closed while each of the other switches in the network is open-circuited, with the possible exception of switch 204 which may be either open or closed, depending upon the computer design. The status of switch 204 is irrelevant because neither the sum nor carry signals derived by full adder 201 on leads 202 and 203 is coupled to any other circuit elements in the computer.

Each of the instruction codes which is not dependent upon an operating mode has now been described; the operating codes for left shift, right shift and right rotate, as well as for feeding data to parallel line 77 from the output of register stage 72 have been discussed supra. Consideration, therefore, will now be given to the relatively complex instructions relating to: countdown, CNTD: count up, CNTU; subtracting the contents of the register comprising stages 71—73 from the binary word applied to lines 76—78, SM; complementing the contents of the register stages 71—73 and selectively adding the complement with a signal on right data line 75, SMZ; adding the word stored in the register comprising stages 71—73 with the word on data lines 76—78, AD; and subtracting the data word on lines 76—78 from the word stored in the register comprising stages 71—73, SUB.

Connections between left and right serial data lines 74 and 75 and the internal register circuitry comprising stages 71—73 for these six instructions depend on the mode configurations. In general for a particular mode, the connections are the same regardless of the instruction. In particular, for modes 0 and 2, the signal on right serial data lead 75 is added to the word stored in the register comprising stages 71—73 through the connection established by switch 333 being closed in response to a timing pulse from unit 82; in mode 1 and 3 configurations the signal on lead 75 is decoupled from the register because switch 333 is always open. In modes 0 and 1 left serial data line 74 is responsive to overflow data derived on highest order carry lead 103 by closing switch 134 in response to timing pulses from unit 82. In contrast, for modes 2 and 3, switch 134 is always open but the overflow indication is derived from flipflop 147, responsive to an output of logic network 148. Hereafter, the connections between the register and terminals 74, 75 are not generally described for the different mode configurations, except in considering specific examples.

Consideration is now given to the specific connections for each of the instructions denominated as: CNTD, CNTU, SM, SMZ, AD and SUB.

The operating code bits *a*—*d* for the countdown, CNTD, instruction are respectively 0, 0, 1, 0. For all of the modes, switches 204, 215 and 221 are energized to the closed state, while switch 242 is energized to the closed state in response to a timing signal from timing and control unit 82. Switches 134, 331 and 333 are selectively energized to the closed state, depending upon the operating mode of the computer, while switch 332 is always open-circuited, regardless of the mode condition.

To provide a better and more complete understanding as to the manner by which the register comprising stages 71—73 functions in response to the countdown instruction, the internal operation of the register, in mode 3, will be initially considered. In mode 3, switches 134 and 333 are open-circuited whereby register stages 71—73 and the circuitry associated therewith are decoupled from external serial lines 74 and 75. The mode 3 signals, in combination with the countdown instruction signals from the operational code, result in the closure of switches 331 to load a binary zero on the C input terminal of full adder 301. Switches 104, 204 and 304 are closed, whereby the true output signals of register stages 71—73 are fed to the A input terminals of full adders 101, 201 and 301, respectively. Switches 115, 215 and 315 are closed to load binary ones into the B input terminals of each of the full adders. The carry signals from the lower order full adders 301 and 201 are coupled through closed switches 221 and 121 to the C inputs of full adders 201 and 101, respectively. Because of the stated connections, the count stored in the register comprising stages 71—73 is reduced by a factor of one in response to each timing pulse generated in timing and control unit 82.

The subtraction operation can be fully appreciated by considering an example wherein stages 71, 72 and 73 are respectively loaded with the binary bits zero, one, one indicative of the binary number representing +3. In response to the stated conditions, the inputs to and outputs of the full adders are: for full adder 301, A=0, B=1, C=1, carry lead 303=1, and sum lead 302=0; for full adder 201, A=1, B=1, C=1 (the carry output of full adder 301), carry lead 203=1, and sum lead 202=1; for full adder 101, A=0, B=1, C=1 (the carry output of full adder 201), carry lead 103=1, and sum lead 102=0. In response to the first timing pulse derived in timing and control unit 82, switches 242 and 342 are both closed to load register stages 72 and 73 with binary bits respectively indicative of 1 and 0 since switch 144 responds to the signal on sum lead 102 to load a zero into stage 71 when the time dependent switches are closed. The sign or polarity signal stored in stage 71 remains a binary zero even though switch 146 is open-circuited because of the inherent memory properties of the circuitry within the stage.

Upon the completion of the first timing pulse and stages 71-—73 respectively storing binary bits zero, one, zero, the inputs to and outputs of the full adders are: for full adder 301, A=0, B=1, C=0, sum lead 302=1 and carry lead 303=0; for full adder 201, A=1, B=1, C=0 (the carry output of full adder 3̄ carry lead 203 =1 and sum lead 202=0; for full adder 101, A=0,B=, C=1 (the carry output of full adder 201), sum lead 102=0 and carry lead 103=1. In response to the second timing pulse derived by timing and control network 82, switches 242 and 342 are closed, whereby stages 72 and 73 are respectively loaded with the binary signals 01, the result of subtracting one from the binary number 10. Again a zero remains loaded in stage 71. From the preceding description, it is believed evident as to the manner by which numbers stored in the register comprising stages 71—73 are subtracted from one in response to each timing pulse derived from timing and control unit 82, while the count down instruction operating code *abcd*x0010 is being derived.

The operation of the system for the count down instruction in mode 1 is similar to the mode 3 operation in that mode switch 331 is closed to feed a binary zero level to the C input of full adder 301. The sole distinction between the mode 1 and mode 3 operation is that switch 134, connected between carry lead 103 and left serial line 74, is closed. Thereby, any carries derived from full adder 101 in response to the subtraction operations are fed from the full adder carry output terminal to the left serial line 75.

The manner by which the polarity indication is obtained for mode 1 operation is seen by initially reviewing the examples of subtracting one from the positive numbers three and two, respectively stored as bits 011 and 010 in registers 71—73. As indicated supra for both numbers, the sum signal on lead 102 is a zero. The zero is fed back to the input of register stage 71 to maintain the stage in the zero, positive indicating state after each timing pulse. Now consider the situation if the number zero is stored in the register, whereby stages 71—73 are loaded with 000 and the inputs and outputs of each of full adders 301, 201 and 101 are: A=0, B=1, C=0, sum lead 302=1, carry load 303=0. In response to a timing pulse, each of switches 144, 242 and 342 is closed to load stages 71—73 with 111. The binary one stored in stage 71 indicates that the result is negative and the binary ones in stages 72 and 73 are indicative of the two's complement of one. When the next or second timing pulse occurs, binary ones are fed to the A and B inputs of adders 101, 201 and 301; a binary zero is applied to the C input of adder 301. Adder 301 derives a binary zero and one on its sum and carry leads 302 and 303, whereby the sum and carry outputs of adders 201 and 101 are all binary one in value. Thereby, upon completion of the second pulse, stages 71, 72 an 73 are respectively loaded with 110, indicating a negative number having a value of two in two's complement binary arithmetic.

In mode 0 switches 134 and 333 are both closed, while switch 144 is closed in response to each timing pulse, whereby the register circuitry is coupled with left and right serial lines 74 and 75 and polarity indications are subject to change. In addition, switch 331 is closed to enable the binary bits on right serial line 75 to be coupled to the C input of full adder 301. Coupling the right serial line 75 to the C terminal of adder 301 enables the register to subtract the contents of stages 71—73 by one, while adding the binary signal on the right serial line. This operation is evident if it is considered that the occurrence of a binary zero on the right serial line has the same effect as closing switch 331, viz., feeding a zero to terminal C of adder 301. The presence of a binary one on right serial line 75 has the effect of adding one to the inherent subtraction operation occurring during the count down instruction.

With the registers interconnected with external lines 74 and 75 during the count down instruction, mode 2, the same connections to full adder 301 subsist as existed during mode 0 operation. The only difference between the mode 0 and mode 2 connections is that switch 134, connected between the carry output of full adder 101 and left serial line 74, is open-circuited. Thereby, no carry signals from full adder 101 are coupled to the left serial line and switch 144 is closed to enable the polarity indicating signal to be stored in stage 71.

Consideration will now be given to the manner by which the register comprising stages 71—73 has the count stored therein advanced by one in response to each timing pulse derived in timing and control unit 82, the count up instruction, CNTU, indicated by the operation code bits *abcd*=0011. In response to the operation code for the count up instruction, switches 204, 216 and 221 are closed independently of time and regardless of the mode configuration. Selectively closed are mode switches 134, 332 and 333, while switch 331 is always open circuited. In response to each timing pulse, switches 144, 242 and 342 are closed to gate the sum signal outputs of full adders 101, 201 and 301 respectively to the inputs of register stages 71, 72 and 73.

In mode 3, the count up operation is independent of any external data sources and no data from within register stages 71—73 are coupled to either of serial lines 74 or 75. These connections are established by open circuiting switches 134 and 333, while switch 332 is closed to gate a binary one level to the C input of full adder 301. The B input of full adder 301, as well as the B inputs of full adders 201 and 101, are responsive to ground voltages indicative of a binary zero level, as coupled through closed switches 316, 216 and 116. The A input terminal of each of full adders 101, 201 and 301 is responsive to the output of register stages 71, 72 and 73, respectively. In response to each timing pulse derived in timing and control network 82, switches 144, 242 and 342 are closed enabling the sum signals on leads 102, 202 and 302 to be respectively stored in stages 71, 72 and 73 to effect a binary addition of one. The carry signals propagated from full adders 301 and 201 to the C inputs of full adders 201 and 101, respectively, enable the count up operation to proceed in a conventional binary counting manner. Because the input levels to each of the B terminals of adders 101, 201 and 301 are of opposite polarity from the B inputs to the adders for the count down instruction, it should be evident that the count up operation functions in a similar, but opposite, manner from the count down operation.

The register functions in mode 1 for the count up operation in a manner similar to the count up operation in mode 3. The only difference between the two modes is that in mode 1 switch 134 is closed, whereby the carry output of full adder 101 on lead 103 is coupled to left serial data line 74. Thereby, the register state is advanced in response to each timing pulse from timing and control unit 82 regardless of signals on right serial data line 75, while feeding carry pulses to left serial data line 74 and the state of polarity indicating stage 71 is subject to variation.

Mode 0 operation differs from mode 1 operation in that binary levels on right serial line 75 are added to the contents of register stages 71—73, whereby the register stage contents are advanced by a count of one or zero, depending upon the level of the signal on lead 75, in response to each timing pulse from timing and control unit 82. To this end, switch 333, connected between the C input of full adder 301 and right serial line 75, is closed while switch 332 is open-circuited. A binary one on right serial line 75 is fed to the C input terminal of full adder 301 with the same result as the application of a binary one level in response to closure of switch 332. The presence of a binary zero on serial line 75, however, alters the operation performed by full adder 301 whereby the carry output on lead 303 is always a binary zero and the sum signal on lead 302 is always the same binary bit as was previously stored in stage 73. Since no carry signals can be derived from full adder 301 a similar result occurs with regard to full adders 201 and 101, and the sum signals derived by all of the full adders on leads 102, 202 and 302 have the same values as the bits stored in register stages 71—73. Thereby, the status of register stages 71—73 remains constant in response to a binary zero level being on right serial line 75 and the system in mode 0 operation.

For mode 2 operation, the variable parallel processor functions in virtually the same manner as was indicated supra with regard to mode 0 operation. The only distinction between the two operating modes is that switch 134 is open circuited for mode 2 operation whereby no carry signal derived from full adder 101 is coupled to left serial data line 74.

Consideration is now given to the instruction for complementing the contents of the register stages 71—73, SMZ, derived in response to the operation code *abcd*=0101. The SMZ instruction operation code causes switches 205, 216 and 221 to be closed as independent time functions; switches 242 and 342 are closed in response to the time pulse derived from timing and control unit 82, while switches 144 and 145 are selectively closed in response to the timing pulses depending upon the overflow conditions and mode configuration extant. Switches 134, 332 and 333 are selectively closed independently of the timing pulses but in response to the operating mode, while switch 331 is always in the open condition.

Closing the time and mode independent switches results in binary zeros being fed to the B input terminals of each of the full adders 101, 201 and 301. In addition, the complement of the signal stored in each of register stages 71, 72 and 73 is respectively fed to the A input terminals of full adders 101, 201 and 301. The C input terminals of full adders 101 and 201 are respectively responsive to the carry outputs of full adders 201 and 301, while the C input terminal of full adder 301 is dependent upon mode switches 332 and 333.

In modes 1 and 3, the C input terminal of full adder 301 is connected with the binary one voltage level at terminal 307 since switch 332 is closed, In response to each timing pulse closing switches 242 and 342, the contents of stages 72 and 73 are two's complemented; in mode 1 the bit stored in stage 71 is two's complemented since switch 144 is closed in response to each timing pulse in the same manner as the contents of stages 72 and 73 are two's complemented.

The two's complementing operation of the number stored in register comprising stages 71—73 while the register stages are connected in mode 1 and responsive to the complement instruction can best be described by considering an example wherein stages 71, 72 and 73 store the binary bits 001, respectively. The two's complement of 001 is 111; derived by complementing 001 and adding 1 to the complement.

The 001 signals stored in stages 71, 72 and 73 are fed to the A input terminals of adders 101, 201 and 301 as the binary signals 110, respectively, because switches 105, 205 an 305 are closed. Full adder 301 responds to the 101 signals on its ABC inputs to derive on sum and carry leads 302 and 303 binary one and zero signals, respectively. The binary zero signal on carry lead 303 is coupled through switch 221 to the C input of full adder 201, the A and B inputs of which are respectively responsive to one and zero levels coupled through switches 205 and 216. Full adder 201 responds to the 100 inputs respectively fed to its input terminals ABC to derive a zero binary level on carry lead 203 and a binary one on sum lead 202. The binary zero level on lead 203 is coupled to the C input of full adder 101, the A and B inputs of which are respectively responsive to one and zero binary levels coupled through switches 105 and 116. Full adder 101 responds to these inputs to derive a binary one on sum output lead 102 and a binary zero on carry output lead 103. The binary one levels derived on each of sum leads 102, 202 and 302 are fed back to the input of stages 71, 72 an 73, respectively, when each of switches 144, 242 and 342 is closed in response to the next timing pulse. Thereby, the register comprising stages 71—73 is loaded with the binary word 111, the two's complement of 001.

The distinctions between mode 1 and mode 3 operation are with regard to the selective activation of switch 134 in mode 1, to the exclusion of mode 3, and activation of switches 144 or 145, as well as overflow flip-flop 147. In mode 1, the carry output of full adder 101 is coupled to left serial data line 74, while the left serial data line 74 is decoupled from the carry output of full adder 101 with the system in mode 3. In mode 3, switch 144 is selectively closed, rather than invariably closed, in response to each time pulse; similarly, switch 145, as well as the set and reset inputs of flip-flop 147, is selectively energized in response to the timing pulses. In particular, switch 144 is closed and the reset input of flip-flop 147 is energized only if no overflow exists, as indicated by the expression: ($\overline{S}_0S_1S_2+S_0\overline{S}_1\overline{S}_2$); switch 145 is closed and the set input of flip-flop 147 is energized only if an overflow is extant.

In modes 0 and 2 for the complement operation instruction code, SMZ, the register connections for the circuitry associated with stage 73 are changed whereby the one's complement of the word stored in the register comprising stages 71—73 is taken and added with the level on right serial data line 75. To this end, the C input of full adder 301 is responsive to the right serial data line 75, as coupled through closed switch 333. If the level of right serial data line 75 is a binary one, the register functions in modes 0 and 2 in a very similar manner to the functioning thereof in modes 1 and 3. This is evident since the binary one level on data lead 75 feeds the same input to full adder 301 input terminal C as the closure of switch 332. This is the desideratum since complementing the contents of the register comprising stages 71—73 and adding a one thereto is the same as forming a two's complement.

With a binary zero on right serial data line 75, the contents of register stages 71—73 are inverted. Inversion occurs because no carry signal can be derived by full adders 201 and 301 on leads 203 and 303, with binary zeros applied to the B and C input terminals of the full adders. The full adders respond to the inverted states of register stages 71—73 as coupled through switch 105, 205 and 305 to derive on sum leads 102, 202 and 302 signals indicative of the inverted register stage conditions. The inverted signals on the sum leads are coupled through switches 242 and 342 to the inputs of register stages 72 and 73, whereby the register stages store the complement of the signal originally loaded therein.

The connections and operations of modes 0 and 2 differ from each other in the same manner as between modes 1 and 2. In modes 0 and 1 the switch 144 invariably closes in response to the timing pulse generated by control unit 82.

The three preceding instruction operations involve adding and complementing in response to signals stored in register stages 71—73 and data on right serial data line 75. In neither the count down, count up nor complement instructions is data fed to the register stages via parallel data lines 76—78. Data may at will be coupled to parallel data lines 74—76 from register stages 71—73 at any time in response to the *e* operation code bit being equal to one since a value of *e*=1 closes switches 122, 222 and 322 to feed the register stage contents to the parallel data lines.

Consideration will now be given to the three operations wherein the contents of register stages 71—73 are combined with the word on parallel data lines 76—78. These operations are: (1) subtract the contents of the register comprising stages 71—73 from the data word on parallel input lines 76—78, SM; (2) add the word stored in the register stages 71—73 to the word on data lines 76—78, AD; and (3) subtract the word on data lines 76—78 from the word stored in register stages 71—73, SUB.

The SM instruction, involving subtracting the register contents from the word on lines 76—78, is performed in response to operation code bits *abcd* being equal to 0100. In response to the SM operation code, time independent switches 205, 211 and 221 are energized to the closed state, while switches 332, 333 and 134 are selectively energized to the closed state depending upon the operating mode. Switches 242 and 342 are activated to the closed state periodically in response to the derivation of a timing pulse by timing and control unit 82 while switches 144 and 145 are selectively closed in the same manner indicated supra for the SMZ instruction, depending upon mode configuration.

In response to the stated switch conditions, the A input terminals of full adders 101, 201 and 301 are respectively responsive to the complements of the signals stored in register stages 71, 72 and 73, while the B input terminals of the full adders are directly responsive to the signals on data lines 76, 77 and 78, in all four modes for the SM instruction. For modes 1 and 3, switch 332 is closed whereby a binary one is fed to the C input of full adder 301, while the C inputs of full adders 201 and 101 are responsive to the carry outputs on leads 303 and 203 of full adders 301 and 201, respectively. In response to the one level being coupled to the C input of full adder 301, the contents of register stages 71—73 are two's complemented and added to the word fed to parallel data lines 76—78. Thereby, two's complement subtraction is achieved.

To provide a clear description as to the manner by which the word stored in register stages 71—73 is subtracted from the word on parallel data line 76—78, with the system in mode 1, consider the example wherein the word on data lines 76, 77 and 78 is the positive number three, represented by the binary levels 011, and that the word stored in the register comprising stages 71—73 is the positive number two, represented by the binary levels 010. The 010 levels stored in register stages 71, 72 and 73 are fed through switches 105, 205 and 305 to the A input terminals of full adders 101, 201 and 301 respectively. The C input terminal of full adder 301 is connected through switch 332 to the binary one voltage level at terminal 307. Thereby, full adder 301 derives a binary one level on each of its output leads 302 and 303. The binary one level on the carry output lead of full adder 301 is coupled through switch 221 to the C input of full adder 201, the A and B inputs of which are respectively responsive to zero and one levels. Full adder 201 responds to the A, B and C inputs thereof to derive a binary zero level on sum lead 202 and a binary one level on carry lead 203. The binary one level on lead 203 is coupled through switch 121 to the C input of full adder 101, the A and B inputs of which are respectively responsive to binary one and zero levels. Adder 101 responds to the A, B and C inputs thereof to derive a zero on sum lead 102 and a one on carry lead 103.

In response to a timing pulse being derived by timing and control network 82, switches 144, 242 and 342 are activated, whereby register stages 71, 72 and 73 are loaded with the binary bits 001, the result of subtracting two from three. The resultant subtraction stored in register stages 71, 72 and 73 is read out from the register stages at will to parallel data lines 76—78 in response to the *e* operation code bit having a binary one value which causes switches 122, 222 and 322 to close.

The SM instruction operations performed for modes 1 and 3 are distinguished in exactly the same manner as indicated supra for the two modes with regard to the SMZ instruction.

The subtraction operation, SM, for modes 0 and 2 involves one's complementing the contents of the register comprising stages 71—73 and adding the complement to the binary level on right serial data line 75 and to the binary word on parallel data lines 76—78. To this end, switch 333 is closed to connect the right serial data line 75 to the C input of full adder 301.

The internal connections within the register remain the same as indicated supra with regard to modes 1 and 3. The presence of a binary one on right serial data line 75 causes the register to function in exactly the same manner as indicated supra for modes 1 and 3 since, in both instances, binary ones are fed to the C input of full adder 301. Hence, the presence of a binary one on right serial line 75 enables subtraction of the contents of register comprising stages 71—73 from the word on parallel data lines 76—78. In response to a binary zero on right serial line 75, however, the word in the register comprising stages 71—73 is one's complemented and then added with the word on parallel data lines 76—78.

To consider the operation of the register more fully with a binary zero on right serial data line and the register activated to mode 0, again assume that stages 71, 72 and 73 have 010 respectively loaded therein and that parallel data lines 76—78 are fed with 011, respectively. The binary zero signal stored in stage 73 is coupled as a binary one to the A input of full adder 301, the B and C inputs of which are respectively at the one and zero levels in response to the signals on leads 78 and 75. The output of full adder 301 is thereby a binary zero on sum lead 302 and a binary one on carry lead 303. The binary one level on carry lead 303 is coupled to the C input of full adder 201, where it is combined with the complement of the state of stage 72, a binary zero level, and the binary one input on lead 77. Adder 201 responds to the ABC=011 inputs thereof to derive on leads 202 and 203 binary zero and one levels, respectively. The binary one level on lead 203 is coupled to the C input of full adder 101, the A and B inputs of which are binary one and zero levels derived from the complement of register stage 71 and the true value of data line 76, respectively. Adder 101 responds to the inputs thereof to derive on leads 102 and 103 binary zero and one levels. In response to the derivation of a timing pulse, switches 144, 242 and 342 are closed whereby register stages 71—73 are all loaded with binary zeros, the result of complementing the binary number 010 and adding the complement to 011.

In mode 0, the zero carry signal on lead 103, indicative of lack or presence of overflow, is coupled through switch 134 to left serial data line 74. In mode 2, however, switch 134 is open circuited, but one of the set or reset inputs to overflow flip-flop 147 is enabled in response to a timing pulse by the logic network 148, depending upon the overflow condition detected by logic network 148 from the A and B inputs to and the sum output of full adder 101. Switches 144 and 145 are also controlled by network 148 to be selectively open and closed for mode 2 operation, in dependence on the presence or absence of overflow.

To understand more fully the functioning of switches 144, 145 and flip-flop 147 for mode 2 and 3 operation, again consider the SMZ operation of subtracting +2 from +3, assuming mode 3 configuration. Under the assumed conditions, the word stored in stages 71, 72 and 73 is 010 and the input word on leads 74, 75 and 76 is 011, whereby the inputs and outputs of full adders 101, 201 and 301 are given supra. Repeating, the inputs and outputs of full adder 101 are: ABC=101, carry =1, sum =0, whereby $S_f$=0, $S_1$=1 and $S_2$=0. Thereby, $\bar{S}_f S_1 S_2 + S_f \bar{S}_1 \bar{S}_2 = 0$ so that switch 144 is closed to gate a zero to the input of stage 71 and flip-flop 147 is reset in response to a timing pulse. Since stages 72 and 73 are loaded with 01, as indicated supra, the word stored in the register comprising stages 71—73 is indicative of a positive integer having a value of unity. Since no overflow is indicated by flip-flop 147, the correct result of the operation is realized.

Next consider SMZ, mode 3 operation when +3 is stored in stages 71—73 as 011 and is subtracted from +2, applied to lines 76—78 as 010. Under the stated conditions the time independent input and output signals of the half adders are: for full adder 301, ABC+001, sum =1, carry =0; for full adder 201, ABC=010, sum =1, carry =0; for full adder 101, ABC=001, sum =1, carry =0. Switch 144 is closed and flip-flop 147 reset in response to each timing pulse since $\bar{S}_f S_1 S_2 + S_f \bar{S}_1 \bar{S}_2 = 0$. Thereby, in response to a timing pulse, the binary one output on each of sum leads 102, 202 and 302 is loaded into stages 71, 72 and 73, and the negative binary value of one, in two's complement code, is stored in the register.

A further example involves SM, mode 3 operation wherein −3 is stored in stages 71—73 in the two's complement code as 101 and is subtracted from +2, applied to lines 76—78 as 010, i.e., the operation of +2−(−3)=+5 is performed. The input and output signals of the half adders under these conditions are: for full adder 301, ABC=001, sum =1, carry =0; for full adder 201, ABC=110, sum =0, carry =1; for full adder 101, ABC=001, sum =1, carry =0. $S_f \bar{S}_1 \bar{S}_2 + \bar{S}_f S_1 S_2$ equals unity so that switch 145 is closed to couple the inverted sum signal to the input of register 71 and the set input of flip-flop 147 is energized in response to a timing pulse. The timing pulse occurrence thereby loads stages 71—73 with the binary bits 001, the four's complement of 2−(−3)=5. The activation or setting of overflow flip-flop 147 indicates that any positive number stored in the register comprising stages 71—73 must be added to four to provide an accurate indication of the operation.

Consideration will now be given to the manner by which the variable parallel processor adds words stored in the register comprising stages 71—73 with words on parallel data lines 76—78, the AD instruction energized by the operation code having a value of *abcd*=0110. In response to the addition instruction, the following time independent switches are closed: switches 104, 204 and 304 to feed the true signals stored in register stages 71, 72 and 73 to the A input terminals of full adders 101, 201 and 301; switches 111, 211 and 311 to feed the true bits on data lines 76, 77 and 78 to the B inputs terminals of full adders 101, 201 and 301, respectively; and switches 121 and 221 to feed the carry outputs of full adders 301 and 201 to the C inputs of full adders 101 and 201, respectively. In addition, switches 331, 333 and 134 are selectively closed depending upon the mode conditions established while switch 332 always remains open circuited. The sum signals developed on output leads 202 and 302 of full adders 101, 201 and 301 are periodically gated through switches 242 and 342 to the inputs of register stages 72 and 73 in response to the derivation of a timing pulse by timing and control unit 82, while switches 144 and 145, as well as flip 147 are selectively energized in response to the timing pulse, depending on the mode configuration.

In modes 1 and 3, switch 331 is closed to feed a binary zero to the C input terminal of full adder 301. Thereby, the sum and carry outputs of full adder 301 on leads 302 and 303, respectively, are indicative solely of the result of adding the contents of stage 73 with the bit on lead 78. The carry signal on lead 303 is propagated to the C input terminal of full adder 201 which functions in the usual manner in response to the signals derived from stage 72 and on lead 77. Adder 101 also functions in the usual addition mode in response to the carry and data signals applied thereto.

In modes 0 and 2, the binary level of right serial line 75 is added to the sum of the words stored in register stages 71—73 and on data lines 76—78 by virtue of switch 333 being closed and switch 331 being open circuited. For a binary zero on right serial line 75, full adder 301 functions in exactly the same manner indicated supra for modes 1 and 3. In response to a binary one level being on right serial line 75, the full adder 301 functions in the same manner as a higher order full adder, for example, full adder 201 or 101, responding to a carry signal. Thereby, the effect of coupling right serial line 74 to the C input of full adder 301 is the same as adding the signal on the right data line to the sum of the word stored in the register comprising stages 71—73 and the word on data lines 76—78.

For modes 2 and 3, switch 134 is open circuited whereby no overflow on lead 103 is propagated to left serial line 74, but overflow indications are derived selectively by logic network 148 feeding flip-flop 147. For modes 0 and 2, switch 134 is closed, whereby overflow indications can be coupled to left serial data line 74, but the logic in network 148 inhibits actuation of flip-flop 147 to the set or overflow indication output.

Consideration is now given to the instruction for subtracting the data word on lines 76—78 from the contents of register stages 71—73, as controlled by the operation code bits *abcd* having values of 0111, respectively. In response to the SUB instruction, the following time independent switches are invariably closed, regardless of mode configuration: switches 104, 204 and 304, to feed the outputs of registers 71, 72 and 73 to the A inputs of full adders 101, 201 and 301, respectively; switches 112, 212 and 312, to feed the complements of the bits on data lines 76, 77 and 78 to the B input terminals of full adders 101, 201 and 301, respectively; and switches 121 and 221 connected between the carry outputs of full adders 201 and 301 to the C inputs of adders 101 and 201, respectively. The mode switches selectively energized to the closed states are switches 332, 333 and 134; switch 331 is never energized to the closed state for the SUB instruction. Switches 242 and 342 are closed in response to each timing pulse generated by timing and control unit 82 while switches 144 and 145 are selectively closed, depending upon the mode configuration, in response to the timing pulse.

In modes 1 and 3 of the subtraction instruction, the two's complement of the binary word on data leads 76—78 is taken and added with the word in register stages 71—73 to perform the subtraction. To this end, switch 332 is closed to load a binary one level on the C input of full adder 301. Full adders 101, 201 and 301 respond to the inputs thereof in the same manner indicated supra with regard to the SMZ instruction, except that the word on the parallel data line is two's complemented, rather than the word stored in stages 71—73. This result should be evident since the complement of the word on the parallel data lines and the true indication of the register stage word is fed to each of full adders 101, 201 and 301 since the full adders respond to their A and B inputs in the same manner. Utilizing similar reasoning, the processor one's complements the word on data lines 76—78 and adds the complement to the signal on right serial line 75 with the word stored in register stages 71—73 with the system in mode 0 or 2 operation, wherein switch 333 is closed and switch 332 is open-circuited.

For modes 0 and 1, switch 134 is closed whereby overflow indications derived on the carry output of full adder 103 are gated to left serial line 74 and the sum signal is fed to the input of register 71 through switch 144 in response to each timing pulse. In modes 2 and 3, switch 134 is open and the overflow signal on lead 103 is not coupled to left serial data line 74, but logic circuit 148 selectively energizes overflow indicator 147 and one of switches 144 or 145 in response to each timing pulse.

A plurality of parallel processes of the type illustrated in FIG. 6 can be advantageously cascaded together or connected in parallel in the same manner as the serial registers as indicated, for example, by FIGS. 3—5. If, for example, binary words having parallel bits of the same order are derived in sequence for different orders, as frequently exists in binary coded decimal notation, are employed in the processor, all of the bits in one word can be applied to one of the registers comprising stages 71—73 and then shifted to a second register prior to the application of the next lower order word.

While there has been described and illustrated one specific embodiment of the invention, it will be clear that variations in the details of the embodiment specifically illustrated and described may be made without departing from the true spirit and scope of the invention as defined in the appended claims. For example, it is to be understood that other types of circuits can be employed for the specific register stages and that instead of utilizing a pair of timing pulses as described, master-slave flip-flops may be employed.

I claim:

1. A data processor comprising a plurality, N, of register stages, each of said stages having an input and an output terminal, one of said stages being the highest order stage and another being the lowest order stage, first and second data lines for feeding signals to and from said highest and lowest order stages, respectively, switch means for selectively connecting: (1) said first data line to the input terminal of said highest order stage while connecting the output terminal of said lowest order stage to said second data line and while connecting the output terminal of each higher order stage, *n*, to the input terminal of the next lower order stage, $n-1$; or (2) the output terminal of each lower order stage, *m*, to the input terminal of the next higher order stage, $m+1$, while connecting the output terminal of said highest order stage to said first line and while connecting the input terminal of said lowest order stage to said second line; where $n=2, 3 \ldots N$, and $m=1, 2 \ldots N-1$, and means for shifting signals stored in said stages toward either of said lines, said switch means including means for at will connecting the output terminal of the lowest order stage with the input terminal of the highest order stage; and means for at will connecting said lines together and for decoupling said highest and lowest order stages from said lines while enabling the stored signals to be shifted.

2. The processor of claim 1 further including means for loading a predetermined binary signal in one of said stages in response to each shift of the signals between said stages while said highest and lowest order stages are decoupled from said lines.

3. The processor of claim 2 wherein said switch means further includes means for selectively decoupling either of said highest or lowest order stages from said first and second lines.

4. The processor of claim 3 further including means for loading a predetermined binary signal into the highest or lowest order stage in response to the lowest and highest order stages being respectively decoupled from the data lines.

5. A data processor comprising a plurality, N, of register stages, each of said stages having an input and an output terminal, one of said stages being the highest order stage and another being the lowest order stage, first and second data lines for feeding signals to and from said highest and lowest order stages, respectively, switch means for selectively connecting: (1) said first data line to the input terminal of said highest order stage while connecting the output terminal of said lowest order stage to said second data line and while connecting the output terminal of each higher order stage, *n* to the input terminals of the next lower order stage $n-1$;or (2) the output terminals of each lower order stage, *m*,to the input terminal of the next higher order stage, $m-1$, while connecting the input terminal of said lowest order stage to said second line and while connecting the output terminal of the highest order stage to said first line; where $n=2, 3 \ldots N$, and $m=1, 2 \ldots N-1$, and means for shifting signals stored in said stages toward either of said lines, wherein said switch means further includes means for at will connecting said lines together and for decoupling said highest and lowest order stages from said lines while enabling the stored signals to be shifted.

6. The processor of claim 5 further including means for loading a predetermined binary signal in one of said stages in response to each shift of the signals between said stages while said highest and lowest order stages are decoupled from said lines.

7. A data processor comprising a plurality, N, of register stages, each of said stages having an input and an output terminal, one of said stages being the highest order stage and the other being the lowest order stage, first and second data lines for feeding signals to and from said highest and lowest order stages, respectively, switch means for selectively connecting: (1) said first data line to the input terminal of said highest order stage while connecting the output terminal of said lowest order stage to said second data line and while connecting the output terminal of each higher order stage, *n*, to the input terminal of the next lower order stage $n-1$; or (2) the output terminal of each lower order stage, *m*, to the input terminal of the next higher order stage, $m+1$, while connecting the output terminal of said highest order stage to said first line and while connecting the input terminal of said lowest order stage to said second line; where $n=2, 3 \ldots N$, and $m=1, 2 \ldots$ N−1, and means for shifting signals stored in said stages toward either of said lines, wherein said switch means further includes means for selectively decoupling either of said highest or lowest order stages from said first and second lines.

8. The processor of claim 7 further including means for loading a predetermined binary signal into the highest or lowest order stage in response to the lowest and highest order stages being respectively decoupled from the data lines.

9. A data processor comprising a plurality, N, of register stages, each of said stages having an input and an output terminal, one of said stages being the highest order stage and the other being the lowest order stage, first and second data lines for feeding signals to and from said highest and lowest order stages, respectively, switch means for selectively connecting: (1) said first data line to the input terminal of said highest order stage while connecting the output terminal of said lowest order stage to said second data line and while connecting the output terminal of each higher order stage, $n$, to the input terminal of the next lower order stage, $n-1$; or (2) the output terminal of each lower order stage, $m$, to the input terminal of the next higher order stage, $m+1$, while connecting the output terminal of said highest order stage to said first line and while connecting the input terminal of said lowest order stage to said second line; where $n=2, 3 \ldots N$, $m=1, 2 \ldots N-1$, and means for shifting signals stored in said stages toward either of said lines, N logic networks, means for connecting each of said logic networks to be responsive to the signal stored in a different one of said stages, and means for coupling another signal to each of said logic networks, and means for coupling an output signal from each of said stages, except stage N, as an input to the logic network responsive to the signal from another register stage, and means for selectively coupling an output from each logic network to the input terminal of a different one of said stages.

10. The processor of claim 9 further including a data lead for each of said stages, and means for selectively coupling a signal from each of said stages to a different one of said data leads.

11. The processor of claim 10 further including means for selectively combining the signal on one of the data lines with a word stored in the register stages.

12. The processor of claim 11 further including means for selectively coupling the signal stored in one of the highest or lowest order stages to the other of said lines.

13. The processor of claim 12 further including means for coupling a signal on each of said data leads to an input of a different one of said logic networks.

14. The processor of claim 13 wherein said switch means includes means for connecting each of said logic networks with a different one of said stages and data leads so that the signal stored in each stage after each activation of said shifting means is a predetermined logic function of the signals previously stored in the stages and on the data leads.

15. The processor of claim 14 wherein said function is OR.

16. The processor of claim 14 wherein said function is AND.

17. The processor of claim 14 wherein said function is EXCLUSIVE OR.

18. The processor of claim 14 wherein said switch means includes means for selectively establishing the predetermined function as any of AND, OR, or EXCLUSIVE OR.

19. The processor of claim 18 wherein said switch means includes means for establishing the predetermined function so that a word on the data leads is added with a word stored in the register stages.

20. The processor of claim 18 wherein said switch means includes means for establishing the predetermined function so that a word on the data leads is subtracted from a word stored in the register stages.

21. The processor of claim 20 including means for selectively performing the subtraction in one's or two's complement binary arithmetic.

22. The processor of claim 18 wherein said switch means includes means for establishing the predetermined function so that a word stored in the register stages is subtracted from a word on the data leads.

23. The processor of claim 22 including means for selectively performing the subtraction in one's or two's complement binary arithmetic.

24. The processor of claim 18 wherein said switch means includes means for selectively establishing the predetermined function so that: (1) a word on the data leads is added with a word stored in the register stages; (2) a word on the data leads is subtracted from a word stored in the register stages; or (3) a word stored in the register stages is subtracted from a word on the data leads.

25. The processor of claim 24 including means for selectively performing either of the subtractions in one's or two's complement binary arithmetic.

26. The processor of claim 25 wherein the logic network responsive to the highest order stage includes means for indicating an overflow condition of the register, and means for selectively coupling overflow signals from the highest order stage to said indicating means or the first data line.

27. The processor of claim 26 wherein said switch means includes means for selectively adding a binary one to a word stored in the register stages.

28. The processor of claim 26 wherein said switch means includes means for selectively subtracting a binary one from a word stored in the register stages.

29. The processor of claim 26 wherein said switch means includes means for selectively complementing a word stored in the register stages.

30. The processor of claim 29 wherein said switch means includes means for selectively one's complementing the word.

31. The processor of claim 29 wherein said switch means includes means for selectively two's complementing the word.

32. The processor of claim 29 wherein said switch means includes means for selectively one's or two's complementing the word.

33. The processor of claim 26 wherein said switch means includes means for selectively: (1) adding a binary one to a word stored in the register stages; (2) subtracting a binary one from a word stored in the register stages; or (3) complementing a word stored in the register stages.

34. The processor of claim 33 wherein each of said logic networks comprises a full adder having sum and carry outputs, the $i$th one of said full adders having a first input responsive to the state of the $i$th register stage, a second input selectively responsive to the signal on the $i$th lead, and a third input selectively responsive to the carry output of the $(i-1)$th full adder, where $i=1, 2, 3 \ldots N$, for the full adder of stage $i=1$, means for selectively coupling binary levels to the third input.

35. The processor of claim 9 further including means for selectively combining the signal on one of the data lines with a word stored in the register stages.

36. The processor of claim 35 further including means for selectively coupling the signal stored in one of the highest or lowest order stages to the other of said lines.

37. The processor of claim 9 further including a data lead for each of said stages, and means for coupling a signal on each of said data leads to an input of a different one of said logic networks.

38. The processor of claim 37 wherein said switch means includes means for connecting each of said logic networks with a different one of said stages and data leads so that the signal stored in each stage after each activation of said shifting means is a predetermined logic function of the signals previously stored in the stages and on the data leads.

39. The processor of claim 38 wherein said function is OR.

40. The processor of claim 38 wherein said function is AND.

41. The processor of claim 38 wherein said function is EXCLUSIVE OR.

42. The processor of claim 38 wherein said switch means includes means for selectively establishing the predetermined function as any of AND, OR, or EXCLUSIVE OR.

43. The processor of claim 37 wherein said switch means includes means for establishing the predetermined function so that a word on the data leads is added with a word stored in the register stages.

44. The processor of claim 37 wherein said switch means includes means for establishing the predetermined function so that a word on the data leads is subtracted from a word stored in the register stages.

45. The processor of claim 44 including means for selectively performing the subtraction in one's or two's complement binary arithmetic.

46. The processor of claim 37 wherein said switch means includes means for establishing the predetermined function so that a word stored in the register stages is subtracted from a word on the data leads.

47. The processor of claim 46 including means for selectively performing the subtraction in one's or two's complement binary arithmetic.

48. The processor of claim 37 wherein said switch means includes means for selectively establishing the predetermined function so that: (1) a word on the data leads is added with a word stored in the register stages; (2) a word on the data leads is subtracted from a word stored in the register stages; or (3) a word stored in the register stages is subtracted from a word on the data leads.

49. The processor of claim 48 including means for selectively performing either of the subtractions in one's or two's complement binary arithmetic.

50. The processor of claim 37 wherein the logic network responsive to the highest order stage includes means for indicating an overflow condition of the register, and means for selectively coupling overflow signals from the highest order stage to said indicating means or the first data line.

51. The processor of claim 50 wherein said switch means includes means for selectively adding a binary one to a word stored in the register stages.

52. The processor of claim 50 wherein said switch means includes means for selectively subtracting a binary one from a word stored in the register stages.

53. The processor of claim 50 wherein said switch means includes means for selectively complementing a word stored in the register stages.

54. The processor of claim 53 wherein said switch means includes means for selectively one's complementing the word.

55. The processor of claim 53 wherein said switch means includes means for selectively two's complementing the word.

56. The processor of claim 53 wherein said switch means includes means for selectively one's or two's complementing the word.

57. The processor of claim 53 wherein said switch means includes means for selectively: (1) adding a binary one to a word stored in the register stages; (2) subtracting a binary one from a word stored in the register stages; or (3) complementing a word stored in the register stages.

58. The processor of claim 37 wherein each of said logic networks comprises a full adder having sum and carry outputs, the $i$th one of said full adders having a first input responsive to the state of the $i$th register stage, a second input selectively responsive to the signal on the $i$th lead, and a third input selectively responsive to the carry output of the $(i-1)$th full adder, where $i=1, 2, 3 \ldots N$, for the full adder of stage $i=1$, means for selectively coupling binary levels to the third input.

59. A data processor comprising N register stages 1 ... N, N logic networks 1 ... N, first means for selectively coupling the $k$th logic network to be responsive to the signal stored in the $k$th stage, where 1 $k$ N, second means for selectively coupling an output signal from stage $n$ through the $n$th logic network as an input to the $n+1$ logic network, where 1 $n$ $N-1$, third means for selectively coupling an output signal from the $k$th logic network to the input of the $k$th stage, N data leads 1 ... N, fourth means for selectively coupling a signal on the $k$th data lead to an input of the $k$th logic network, and means for controlling said first, second, third and fourth coupling means so that the signals stored in the stages are one of a plurality of predetermined logic and binary arithmetic functions of the signals previously stored in the stages and on the data leads.

60. The processor of claim 59 wherein one of said functions is OR.

61. The processor of claim 59 wherein one of said functions is AND.

62. The processor of claim 59 wherein one of said functions is EXCLUSIVE OR.

63. The processor of claim 59 wherein said switch means includes means for selectively establishing the predetermined function as any of AND, OR, or EXCLUSIVE OR.

64. The processor of claim 59 wherein said switch means includes means for establishing the predetermined function so that a word on the data leads is added with a word stored in the register stages.

65. The processor of claim 59 wherein said switch means includes means for establishing the predetermined function so that a word on the data leads is subtracted from a word stored in the register stages.

66. The processor of claim 65 including means for selectively performing the subtraction in one's or two's complement binary arithmetic.

67. The processor of claim 59 wherein said switch means includes means for establishing the predetermined function so that a word stored in the register stages is subtracted from a word on the data leads.

68. The processor of claim 67 including means for selectively performing the subtraction in one's or two's complement binary arithmetic.

69. The processor of claim 59 wherein said switch means includes means for selectively establishing the predetermined function so that: (1) a word on the data leads is added with a word stored in the register stages; (2) a word on the data leads is subtracted from a word stored in the register stages; or (3) a word stored in the register stages is subtracted from a word on the data leads.

70. The processor of claim 69 including means for selectively performing either of the subtractions in one's or two's complement binary arithmetic.

71. The processor of claim 59 wherein each of said logic networks comprises a full adder having sum and carry outputs, the $i$th one of said full adders having a first input response to the state of the $i$th register stage, a second input selectively responsive to the signal on the $i$th lead, and a third input selectively responsive to the carry output of the $(i-1)$th full adder, where $i=1, 2, 3 \ldots N$, for the full adder of stage $i=1$, means for selectively coupling binary levels to the third input.

72. The processor of claim 59 wherein said switch means further includes means for selectively shifting the bits stored in the stages from one stage to another in either direction.

73. The processor of claim 59 wherein said switch means further includes switch means for coupling signals between said stages so that a word stored therein is selectively either complemented, advanced by a count of one or subtracted from by a count of one.

74. A data processor comprising a plurality of register stages, and switch means for coupling signals between said stages, said switch means including means responsive to a single pulse for selectively complementing a word stored in the register stages, for advancing a word stored in the register stages by a predetermined count, and for subtracting a count of one from a word stored in the register stages, said switch means further including means for selectively shifting bits stored in the stages to other stages in either direction.

75. A data processor comprising N register stages, N logic networks, means for connecting each of said logic networks to be responsive to the signal stored in a different one of said stages, means for coupling another signal to each of said logic networks, means for coupling an output signal from each of said stages, except stage N, as an input to a logic network responsive to the signal from another register stage, means for selectively coupling an output from each logic network to an input of a different one of said stages, and means for selectively coupling shift and carry bits from a single input lead to the first of said stages and the logic network responsive to the signal stored in the first stage, respectively.

76. A data processor comprising N register stages, N logic networks, means for connecting each of said logic networks to be responsive to the signal stored in a different one of said stages, means for coupling another signal to each of said logic networks, means for coupling an output signal from each of said stages, except stage N, as an input to a logic network responsive to the signal from another register stage, means for selectively coupling an output from each logic network to an input of a different one of said stages, and means for selectively coupling shift and carry bits to a single output lead from the last of said stages and the logic network responsive to the signal stored in the last stage, respectively.

77. The data processor of claim 76 further including means for selectively coupling shift and carry bits from a single input lead to the first of said stages and the logic network responsive to the signal stored in the first stage, respectively.